United States Patent [19]

Matsuo et al.

[11] Patent Number: 5,149,581

[45] Date of Patent: Sep. 22, 1992

[54] POLYETHER COPOLYMERS, RESIN COMPOSITIONS CONTAINING THEM, AND MOLDED ARTICLES FORMED FROM THEM

[75] Inventors: Shigeru Matsuo; Shigeru Murakami; Shinji Chino; Hiroyuki Higuchi; Mikiya Hayashi, all of Chiba, Japan

[73] Assignee: Idemitsu Kosan Co., Ltd., Tokyo, Japan

[21] Appl. No.: 612,609

[22] Filed: Nov. 13, 1990

[30] Foreign Application Priority Data

| Nov. 21, 1989 | [JP] | Japan | 1-302753 |
| Dec. 11, 1989 | [JP] | Japan | 1-321008 |
| Dec. 21, 1989 | [JP] | Japan | 1-329467 |
| Dec. 28, 1989 | [JP] | Japan | 1-338095 |
| Jan. 8, 1990 | [JP] | Japan | 2-000447 |

[51] Int. Cl.$^5$ .................. B32B 27/00; C08G 65/40
[52] U.S. Cl. ................... 428/224; 428/290; 428/364; 428/500; 428/515; 428/522; 428/910; 524/401; 524/424; 524/847; 525/436; 525/437; 525/471; 525/534; 525/535; 525/540; 528/125; 528/126; 528/128; 528/206; 528/208; 528/210; 528/211; 528/219
[58] Field of Search .............. 528/125, 126, 128, 206, 528/208, 210, 211, 219; 524/401, 424, 847; 525/436, 437, 471, 534, 535, 540; 428/224, 290, 364, 560, 515, 522, 910

[56] References Cited

U.S. PATENT DOCUMENTS

| 3,970,681 | 7/1976 | Marvel et al. | 528/125 X |
| 4,567,248 | 1/1986 | Blinne et al. | 528/211 |
| 4,640,974 | 2/1987 | Matsuo et al. | 528/211 |
| 4,766,197 | 8/1988 | Clendinning et al. | 528/125 |
| 4,853,443 | 8/1989 | Matsuo et al. | 525/534 |
| 4,968,769 | 11/1990 | Wang | 528/210 |

FOREIGN PATENT DOCUMENTS

| 0192262 | 8/1986 | European Pat. Off. |
| 0193003 | 9/1986 | European Pat. Off. |
| 0193114 | 9/1986 | European Pat. Off. |
| 0373633 | 6/1990 | European Pat. Off. |
| 47-14270 | 8/1972 | Japan |
| 54-90296 | 7/1979 | Japan |
| 60-235835 | 11/1985 | Japan |
| 2203744 | 10/1988 | United Kingdom |

OTHER PUBLICATIONS

Patent Abstracts of Japan, vol. 10, No. 107 (C-341)[2164] Apr. 22, 1986 (abstract of JP 60-235835).

*Primary Examiner*—George F. Lesmes
*Assistant Examiner*—Christopher Brown
*Attorney, Agent, or Firm*—Frishauf, Holtz, Goodman & Woodward

[57] ABSTRACT

A polyether copolymer comprising the repeating units represented by the following general formula (I)

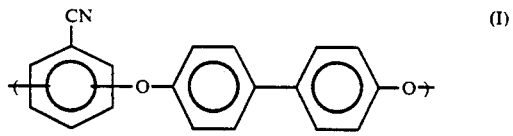

and the repeating units represented by the following formula (II)

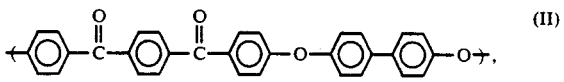

the molar ratio of (I)/{(I)+(II)} being from 0.1 to 0.8 and the polyether copolymer having a melt viscosity of at least 500 poise as measured at 400° C. is produced by allowing a dihalogenobenzonitrile, 1,4-bis(4'-halobenzoyl)benzene, and 4,4'-biphenol to react with each other in an aprotic polar solvent in the presence of an alkali metal compound. The polyether copolymer exhibits excellent heat-resistance, solvent resistance, and mechanical strength, and is suitable as a material for resin compositions, heat-resistant laminates, fiber, and film.

47 Claims, No Drawings

POLYETHER COPOLYMERS, RESIN COMPOSITIONS CONTAINING THEM, AND MOLDED ARTICLES FORMED FROM THEM

BACKGROUND OF THE INVENTION

(a) Field of the Invention

The present invention relates to a novel polyether copolymer and a method of producing the same. More particularly, the present invention relates to a polyether copolymer and a method of producing the same with a simple procedure and high efficiency, which is crystalline and exhibits sufficient heat resistance and as well has excellent solvent resistance and mechanical strength. The novel polyether copolymer is useful as a material in the field of electric and electronic apparatuses and instruments and in the field of machinery.

The present invention further relates to a resin composition containing the polyether copolymer, more particularly, to a thermoplastic resin composition which, because of its excellent properties including high mechanical strength and heat-resistance, excellent inflammability, good moldability, is suitable as a material for various polymer molded articles, such as the parts for electric and electronic apparatuses and instruments and machines.

The present invention further relates to molded articles formed from the polyether copolymer. Concretely, the present invention further relates to a heat-resistant laminate comprising a layer of the polyether copolymer and a layer of a fibrous reinforcing material, more particularly, to a heat resistant laminate which exhibits sufficient heat resistance, excels in mechanical strength, electrical properties, inflammability, chemical resistance, and moldability, and is useful as a novel material suitable for the fields of electric and electronic apparatuses and instruments, machinery, and chemical industries.

Also, the present invention relates to polyether copolymer fiber made of the polyether copolymer, more particularly, to polyether copolymer fiber which has excellent properties including high heat resistance and mechanical strength and is suitable, for example, as a material for composite materials or as a material for woven or knitted fabric.

Further, the present invention relates to a polyether copolymer film made of the polyether copolymer, more particularly, the present invention relates to a polyether copolymer film which excels in heat resistance, mechanical strength, solvent resistance, chemical resistance, and inflammability, and is suitable, for example, as a material for the parts of electric and electronic apparatuses and instruments and machines.

(b) Description of the Related Art

In recent years, engineering plastics having various structures have been developed and used in many fields including the field of automobiles, electric and electronic fields, the field of precision instruments, the field of office automation instruments, and the field of optical communication instruments. The efficiency of these plastics, however, is insufficient to satisfy all requirements, and because of the increasing strictness of the requirements for their efficiency there is a demand for the development of novel materials.

Polyether copolymer is one of these conventional engineering resins and exhibits, in particular, excellent heat resistance, and therefore various kinds of polyether copolymers have been proposed.

For instance, in Japanese Patent Application Kokai Koho (Laid-open) No. 47-14270 proposed is a method of producing aromatic polyether copolymers in which dinitrobenzonitrile, a dihalogenobenzophenone, and a dihydric phenol are allowed to react with each other in the presence of an alkali metal compound. However, the method provides no more than low molecular weight copolymers having a melt viscosity of at most 200 poise at 400° C., and the obtained copolymers do not have sufficient heat resistance and mechanical strength.

In Japanese Patent Application Kokai Koho (Laid-open) No. 60-235,835 disclosed is a method wherein a dihalogenobenzonitrile, 4,4'-dihalogenobenzophenone, and an alkali metal salt of a dihydric phenol are allowed to react to produce a polyether copolymer comprising the repeating units represented by the following formula (a):

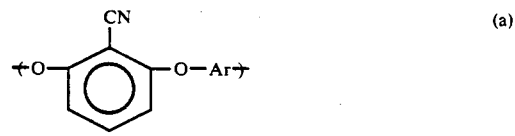

the repeating units represented by the following formula (b):

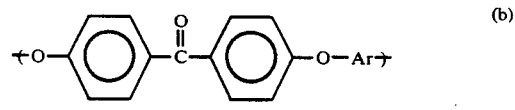

wherein Ar represents a divalent aromatic group, and containing the repeating units represented by the formula (a) in a ratio of at least 0.5. However, the polyether copolymer is amorphous and therefore cannot maintain its mechanical strength at the temperatures higher than its glass transition temperature and cannot exhibit sufficient heat resistance.

In Great Britain Patent No. 2203744 proposed is a method of producing a polymer comprising the repeating units represented by the following formula:

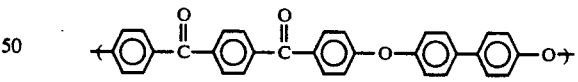

by allowing 4,4'-biphenol and a 1,4-bis(4'-halobenzoyl)-benzene to react with each other. Though the polymer has a melting point of 430° C. and is usable as a nucleic agent for crystallizing polymers, the melting point thereof is too high to mold it by using ordinary methods.

Furthermore, some uses requires more excellent properties of thermoplastic engineering plastics, and, as well, there is an increasing demand for high inflammability to ensure the safety during use. Generally, metal oxides or halogen compounds have been used as flame retardants to be mixed into the thermoplastic engineering resins. However, a large amount of these metal oxides or halogen compounds are required to render thermoplastic resins, such as the conventional engineering resins, sufficient inflammability, thereby causing problems, including a considerable increase in the weight of the obtained resin compositions and a decrease in the mechanical strength and the moldability.

Now then, laminates obtainable by impregnating cloth or mat made of glass fiber or carbon fiber with thermosetting resins followed by curing the thermosetting resins have been well known as materials for electric and electronic parts or machine parts. However, the production of the laminates of this kind needs solvents, which not only contaminates the working environment but also requires the step for collecting the solvents used, and, in addition, a lengthy heat treatment is required to cure the thermosetting resins. In order to solve these problems, there has been proposed that thermoplastic resins having high heat resistance be used in place of thermosetting resins as a material for the laminates. Typical examples of the thermoplastic resins proposed include crosslinked polyethylene, polyethylenetetrafluoride, and polyphenyleneoxide. However, the heat resistance of crosslinked polyethylene is not sufficiently high, and polyethylenetetrafluoride is poor in moldability. Besides, in the fields requiring heat resistance and chemical resistance, polyphenyleneoxide is unsuitable as a material resin for the laminates because of a lack of enough heat resistance and chemical resistance.

Further, fibers made of various engineering resins excelling in heat resistance and mechanical strength are used in many fields, nevertheless the fibers are still not satisfactory in some aspects, and it is hoped to develop fiber made of novel materials. For example, there are some propositions of the use of polyetherketone copolymers, which are known as an engineering resin (Refer to Japanese Patent Application Kokai Koho (Laid-open) No. 54-90296). These conventional resins however have problems, for example, low glass transition temperatures (Tg) which make them unsuited for the use requiring high heat resistance, and insufficient mechanical properties, such as mechanical strength including tensile strength, knot strength, and Young's modulus of elasticity. Moreover, some resins have more problems in that they are apt to gel, thereby hindering the spinning of fiber.

In recent years, there have been developed various kinds of resin films having excellent heat resistance and mechanical strength, which came to be used for a wide range of uses as materials for the parts of electric and electronic apparatuses and instruments and machines. As the resin films came to be used widely, the demand for resin films having more excellent properties has increased. There are known films formed from various kinds of high efficiency resins. Nevertheless, even the films made of polyetheretherketones and known to have the most excellent heat resistance and mechanical strength among the known resin films do not have sufficiently satisfactory film properties because the resin is apt to contain gel due to the drastic condition during the production thereof.

SUMMARY OF THE INVENTION

An object of the present invention is to provide a novel polyether copolymer which is useful as a new material because not only it is crystalline, thereby exhibiting extremely high heat resistance, but also it can be molded by using ordinary techniques and has a high molecular weight sufficient to exhibit high mechanical strength, and to provide a method of producing the polyether copolymer with high efficiency.

Another object of the present invention is to provide a resin composition which has good moldability, maintains sufficiently high mechanical strength even at high temperatures, and has excellent inflammability, heat resistance, and mechanical properties.

A further object of the present invention is to provide a laminate excelling not only in mechanical strength but also in other properties including electric properties, inflammability, chemical resistance, and processability.

Another object of the present invention is to provide a polyether copolymer fiber which is a novel polymer fiber being advantageous in that it excels in heat resistance because of its high glass transition temperature and as well excels in mechanical properties including mechanical strength and in moldability into fiber (spinning and stretching).

A still another object of the present invention is to provide a polyether copolymer film which is advantageous in that it excels in heat resistance because of its high glass transition temperature and in mechanical properties including mechanical strength and, in addition, excels in solvent resistance, chemical resistance, and inflammability.

We found that a specified polyether copolymer is crystalline and exhibits extremely excellent heat resistance, and it as well excels in solvent resistance, mechanical strength, and moldability, and on the basis of the finding, we have completed the present invention.

That is, the present invention provides a polyether copolymer, comprising: the repeating units represented by the following general formula (I)

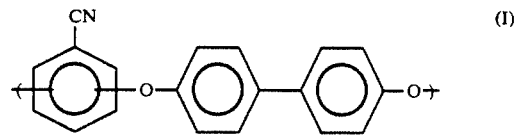

and the repeating units represented by the following formula (II)

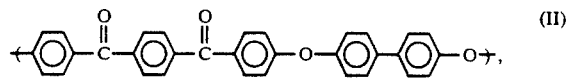

the molar ratio of the repeating units represented by the formula (I) based on the total of the repeating units represented by the formula (I) and the repeating units represented by the formula (II) [the molar ratio of (I)/{(I)+(II)}] being from 0.1 to 0.8 and the polyether copolymer having a melt viscosity of at least 500 poise as measured at 400° C.

The polyether copolymer may be produced efficiently by a method in which dihalogenobenzonitrile, 1,4-bis(4'-halobenzoyl)benzene, and 4,4'-biphenol are allowed to react with each other in an aprotic polar solvent in the presence of an alkali metal compound.

We found that a resin composition satisfying the object of the present invention is obtainable by mixing the polyether copolymer with other heat resistant thermoplastic resins or inorganic fillers in a specific ratio, and have achieved the present invention concerning a novel resin composition.

That is, the present invention provides a resin composition, comprising:

(A) the polyether copolymer of the present invention and (B) a heat-resistant thermoplastic resin other than the polyether copolymer.
the polyether copolymer being present within the resin composition in an amount of from 10 to 90% by weight based on the total of the polyether copolymer and the heat-resistant thermoplastic resin, and provides a resin composition, comprising:

(A) the polyether copolymer of the present invention and (C) an inorganic filler.

the polyether copolymer being present within the resin composition in an amount of from 10 to 90% by weight based on the total of the polyether copolymer and the inorganic filler, and provides a resin composition, comprising:

(A) the polyether copolymer of the present invention;

(B) a heat-resistant thermoplastic resin other than the polyether copolymer; and (C) an inorganic filler;

the polyether copolymer being present within the resin composition in an amount of from 10 to 90% by weight based on the total of the polyether copolymer and the heat-resistant thermoplastic resin, and the inorganic filler being present within the resin composition in an amount of from 1 to 50% by weight based on the total of the polyether copolymer, the heat-resistant thermoplastic resin, and the inorganic filler.

We further found that the polyether copolymer of the present invention is useful as a resin component of heat-resistant laminate. That is, the present invention further provides a heat-resistant laminate, comprising:

(A) a layer of the polyether copolymer of the present invention and (B) a layer of a fibrous reinforcing material.

We found that polymer fiber satisfying the object of the present invention is obtainable by using the polyether copolymer of the present invention as a resin material and melt spinning it under a specified condition, particularly, by stretching the fiber obtained by the melt spinning by a specified draw ratio following to the melt spinning.

That is, the present invention further provides a polyether copolymer fiber produced by melt spinning the polyether copolymer of the present invention at a temperature higher than the melting point of the polyether copolymer by from 10 to 70° C. The properties of the polyether copolymer fiber may be further improved by subjecting the fiber to stretching treatment or both to stretching treatment and to heating treatment, following to the melt spinning.

We further found that a film satisfying the object of the present invention may be obtained by using the polyether copolymer of the present invention as a resin material and forming the polyether copolymer under a specified condition, particularly, by subjecting the film obtained by the forming to stretching treatment by a specified draw ratio or to heating treatment, following to the forming of the film.

That is, the present invention further provides a polyether copolymer film produced by forming the polyether copolymer of the present invention into a film at a temperature higher than the melting point of the polyether copolymer by from 10 to 100° C. The properties of the polyether copolymer film may be further improved by subjecting the film to stretching treatment or heating treatment following to the forming of the film.

DESCRIPTION OF THE PREFERRED EMBODIMENTS

Polyether Copolymer

One of the most important points of the polyether copolymer of the present invention is that the polyether copolymer comprises the repeating units represented by the formula (I) and the repeating units represented by the formula (I), and the molar ratio of the repeating units represented by the formula (I) based on the total of the repeating units represented by the formula (I) and the repeating units represented by the formula (II) [the molar ratio of (I)/{(I)+(II)}] is from 0.1 to 0.8. The preferred molar ratio is from 0.1 to 0.5.

If the molar ratio of the repeating units represented by the formula (1) is less than 0.1, the glass transition temperature of the polyether copolymer will be decreased, resulting in a decrease in heat resistance, and the melting point of the polyether copolymer will be increased, resulting in the deterioration of moldability. On the other hand, if it is more than 0.8, the polyether copolymer will loose crystallinity, resulting in decreases in heat resistance and in solvent resistance.

It is also important that the polyether copolymer of the present invention has a melt viscosity (the viscosity under no shearing stress) of at least 500 poise at 400° C. The reason is that a low molecular weight polyether copolymer having a melt viscosity of less than 500 poise cannot exhibit sufficient heat resistance and mechanical strength. The preferred melt viscosity is at least 1,000 poise.

The polyether copolymer of the present invention may contain other repeating units so far as the achievement of the object of the present invention is not hindered.

The polyether copolymer of the present invention generally has a melting point of from about 300° C. to about 400° C., and it is crystalline and has a sufficiently high molecular weight, thereby exhibiting sufficient heat resistance and excellent solvent resistance and mechanical strength. The polyether copolymer of the present invention, therefore, is suitable as a novel material in the fields of electric and electronic apparatus and instruments and the fields of machinery.

The Method of Producing the Polyether Copolymer

The polyether copolymer of the present invention may be produced efficiently according to the method of the present invention by allowing a dihalogenobenzonitrile, 4,4'-biphenol, and 1,4-bis(4'-halobenzoyl)benzene to react with each other in an aprotic polar solvent in the presence of an alkali metal compound.

Some examples of the dihalogenobenzonitrile to be used in the method of the present invention include 2,3-dihalogenobenzonitrile, 2,4-dihalogenobenzonitrile, 2,5-dihalogenobenzonitrile, 2,6-dihalogenobenzonitrile, 3,4-dihalogenobenzonitrile, 3,5-dihalogenobenzonitrile, and mixtures of two or more of them. Generally, for example, 2,6-dihalogenobenzonitrile represented by the following formula:

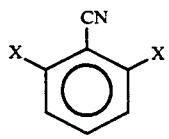

wherein X is a halogen atom and the two X in the formula are identical with or different from each other, or 2,4-dihalogenobenzonitrile represented by the following formula:

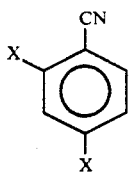

wherein X is as defined above, is suitably used.

Among these, the preferred examples include 2,6-dichlorobenzonitrile, 2,6-difluorobenzonitrile, 2,4-dichlorobenzonitrile, and 2,4-difluorobenzonitrile, and the particularly preferred is b 2,6-dichlorobenzonitrile.

These may be used individually or in a combination of two or more of them.

4,4'-biphenol is represented by the following formula:

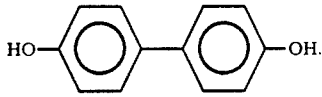

The 1,4-bis(4'-halobenzoyl)benzene to be used in the present invention is represented by the following formula:

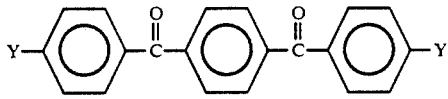

wherein Y is a halogen atom and the two Y in the formula are identical with or different from each other, and, among these, the preferred are 1,4-bis(4'-chlorobenzoyl)benzene, 1,4-bis(4'-fluorobenzoyl)benzene, and 1-(4'-chlorobenzoyl)-4-(4''-fluorobenzoyl)benzene, and the particularly preferred are 1,4-bis(4'-chlorobenzoyl)benzene and 1,4-bis(4'-fluorobenzoyl)benzene.

These may be used individually or in a combination of two or more of them.

The alkali metal compound to be used in the present invention is not particularly limited so far as it can convert 4,4'-biphenol to an alkali metal salt, and the preferred examples include alkali metal carbonates and alkali metal hydrogen carbonates.

Some examples of the alkali metal carbonates include lithium carbonate, sodium carbonate, potassium carbonate, rubidium carbonate, and cesium carbonate. Among these, the preferred are sodium carbonate and potassium carbonate.

Some examples of the alkali metal hydrogen carbonates include lithium hydrogen carbonate, sodium hydrogen carbonate, potassium hydrogen carbonate, rubidium hydrogen carbonate, and cesium hydrogen carbonate. Among these, the preferred are sodium hydrogen carbonate and potassium hydrogen carbonate.

Among the above-described various alkali metal compounds, the particularly preferred are sodium carbonate and potassium carbonate.

These may be used individually or in a combination of two or more of them.

Some examples of the aprotic polar solvent to be used in the present invention include N,N-dimethylformamide, N,N-diethylformamide, N,N-dimethylacetamide, N,N-diethylacetamide, N,N-dipropylacetamide, N,N-dimethylbenzamide, N-methyl-2-pyrrolidone (NMP); N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethylpiperidone, dimethylsulfoxide, diethylsulfoxide, sulfolane, 1-methyl-1-oxosulfolane, 1-ethyl-1-oxosulfolane, 1-phenyl-1-oxosulfolane, N,N'-dimethylimidazolidinone (DMI), and diphenylsulfone.

The preferred are NMP, DMI, sulfolane, diphenylsulfone, and dimethylsulfoxide, and the particularly preferred is NMP.

These solvents may be used individually, or may be used in a combination of two or more of them according to demand. Also, these solvents may be used as solvent mixtures with other solvents such as aromatic hydrocarbon solvents, according to demand. For instance, using these aprotic polar solvents together with aromatic hydrocarbons which are easy to distill out as azeotropic mixtures with water, such as toluene, enables the water generated by condensation to be removed out from the reaction system effectively during the polymerization reaction.

The molar ratio of the dihalogenobenzonitrile used is generally from 0.1 to 0.8 based on the total of the dihalogenobenzonitrile used and the 1,4-bis(4'-halobenzoyl)benzene, and the amount of the alkali metal compound used is generally from 1.01 to 2.50 equivalent, preferably from 1.02 to 1.25 equivalent, per one hydroxyl group of 4,4'-biphenol used.

The amount of the aprotic polar solvent used is not particularly limited, but generally, it is from 200 to 2,000 parts by weight per 100 parts by weight of the total of the dihalogenobenzonitrile, the 1,4-bis(4'-halobenzoyl)benzene, 4,4'-biphenol, and the alkali metal compound.

The molar ratio of the 1,4-bis(4'-halobenzoyl)benzene used is so adjusted that the molar ratio of the total of the 1,4-bis(4'-halobenzoyl)benzene and the dihalogenobenzonitrile to 4,4'-biphenol be approximately 1, generally from 0.98 to 1.02, preferably from 1.00 to 1.01.

The production of the polyether copolymer of the present invention may be carried out by allowing the dihalogenobenzonitrile and 4,4'-biphenol to react with each other to obtain an oligomer which is then allowed to react with 1,4-bis(4'-halobenzoyl)benzene, or by charging all of the dihalogenobenzonitrile, 4,4'-biphenol, and the 1,4-bis(4'-halobenzoyl)benzene at the same time in a reaction vessel to react with each other at the same time.

In the former case, after the dihalogenobenzonitrile, 4,4'-biphenol, and the alkali metal compound are added in the aprotic polar solvent at the same time to carry out the reaction of the dihalogenobenzonitrile with 4,4'-biphenol the 1,4-bis(4'-halobenzoyl)benzene is then added n the reaction mixture to carry out the following reaction. The one series of reactions are carried out generally at a temperature from 150to 380° C., preferably from 180 to 330° C.

The reaction time of the one series of reactions is generally from 0.1 to 10 hours, preferably from 1 to 5 hours.

In the latter case, namely in the case where the dihalogenobenzonitrile, 4,4'-biphenol, and the 1,4-bis(4'-halobenzoyl)benzene are charged at the same time, the reaction temperature is the same as described above but the reaction time is generally from 0.5 to 5 hours, preferably from 1 to 3 hours.

In either case, a reaction temperature lower than 150° C. is impractical because the reaction velocity is too slow, and a reaction temperature higher than 380° C. sometimes causes undesirable side reactions.

After the completion of the reaction, the polyether copolymer is collected by separating it from the aprotic polar solvent solution containing the polyether copolymer and then purifying the separated polyether copolymer, according to known techniques.

Thus the polyether copolymer of the present invention may be produced efficiently through a simple process.

Resin Composition

One of the most important points of the resin composition is that the polyether copolymer contained therein comprises the repeating units represented by the formula (I) and the repeating units represented by the formula (II), and the ratio between these repeating units is within the range described above.

If the molar ratio of the repeating units represented by the formula (I), namely the molar ratio of $(I)/\{(I)+(II)\}$, is less than 0.1, the melting point of the polymer will be too high causing a high melting viscosity which makes it difficult to melt mix it with other additive components to form a uniform resin composition. Further in such a case, the glass transition temperature (Tg) of the polyether copolymer will be low, and such a polyether copolymer sometimes cannot bring sufficient heat resistance and sufficient mechanical strength at high temperatures into the resin composition. On the other hand, if the molar ratio is more than 0.8, the polyether copolymer will be amorphous, and the heat resistance, solvent resistance, and chemical resistance of the resin composition will be decreased.

It is also important that the polyether copolymer to be used in the present invention has a melt viscosity (the viscosity under no shearing stress) of at least 500 poise, preferably at least 1,000 poise, as measured at 400° C. The reason is that low molecular weight polyether copolymers having a melt viscosity of less than 500 poise sometimes cannot render the resin composition sufficient heat resistance and mechanical strength.

The upper limit of the melt viscosity of the polyether copolymer cannot be determined uniformly but from the view point of the moldability of the resin composition (flowability at the time of molding, etc.), it is desirable to adjust the melt viscosity not higher than about 100,000 poise.

In the present invention, the resin composition may contain one kind of the polyether copolymer or two or more kinds of the polyether copolymers.

Further, the polyether copolymer may contain other repeating units so far as the achievement of the object of the present invention is not hindered.

The heat-resistant thermoplastic resin to be used as a component of the resin composition of the present invention is not particularly limited, and various kinds of ones including known ones may be used. Generally, it is desirable to use various kinds of thermoplastic engineering resins, including polycarbonates, polyethersulfones, polyetherimides, polyetheretherketones, polycyanoarylethers, polyesters such as polyethyleneterephthalate, polybutyleneterephthalate, polyarylates, and wholly aromatic polyesters, and polyphenylenesulfides: and other various kinds of thermoplastic resins having heat resistance and mechanical strength comparable to those of the thermoplastic engineering resins described above.

These heat-resistant thermoplastic resins may be used individually or in a combination of two or more of them, according to purpose.

The inorganic filler to be used as a component of the resin composition of the present invention is not particularly limited, and various kinds of inorganic fillers which have been ordinarily used for thermoplastic resins including thermoplastic engineering resins may be used.

More concretely, some examples of the inorganic filler which may be used include fibrous inorganic materials, the typical examples thereof being fibrous reinforcing materials, such as carbon fiber, glass fiber, alumina fiber, silicon nitride fiber and carbon whisker, various metal oxides, such as titanium oxide, aluminum oxide, silicon oxide, and magnesium oxide: various kinds of clay or minerals, such as talc, clay, montmorillonite, bentonite, and dolomite; various metal salts including carbonates, such as calcium carbonate, magnesium carbonate, and barium carbonate, sulfates or sulfites, such as calcium sulfate, calcium sulfite, and magnesium sulfate; metals, such as copper, iron, zinc, aluminum, and nickel: ceramics including various carbides, such as silicon carbide, and nitrides, such as silicon nitride, aluminum nitride, titanium nitride, and boron nitride; and other inorganic fillers, such as graphite, carbon black, and asbestos.

Among these inorganic fillers, the fibrous reinforcing materials, such as carbon fiber and glass fiber, are particularly desirable because of their significant effect in improving mechanical strength.

The inorganic fillers described above may be used individually or in a combination of two or more of them.

The shape of the inorganic filler to be added in the resin composition is not particularly limited, and may be properly selected in consideration of the purpose of use and moldability.

The inorganic filler preferably has a mean particle size of from 0.01 to 60 $\mu$m.

In case the fibrous inorganic fillers including the fibrous reinforcing materials described above are used, it is generally desirable to use those having a mean fiber diameter of from about 1 to about 20 $\mu$m, and an aspect ratio of from about 100 to about 3,000.

If the inorganic filler has a too large mean particle size (in case of the fibrous inorganic materials, mean fiber diameter and aspect ratio), the inorganic filler may be difficult to disperse uniformly, and the moldability thereof may be deteriorated. On the other hand, inorganic fillers of ultrafine particulate form having an extraordinarily samll mean particle size generally are expensive and increase the cost of production. Also, those having a smaller aspect ratio sometimes cannot show the effect as fibrous reinforcing materials sufficiently.

The resin composition of the present invention comprising the polyether copolymer and the heat-resistant thermoplastic resin contains the polyether copolymer in an amount of from 10 to 90% by weight, preferably from 30 to 80% by weight, based on the total of the polyether copolymer and the heat-resistant thermoplastic resin.

If the amount of the polyether copolymer is less than 10% by weight, the improvement of mechanical strength and the effect of rendering inflammability will be insufficient, and on the other hand, even if the amount of the polyether copolymer is more than 90% by weight, the effect of adding the polyether copolymer into the thermoplastic resin will not further increase.

The resin composition of the present invention comprising the polyether copolymer and the inorganic filler contains the polyether copolymer in an amount of from 30 to 99% by weight, preferably from 70 to 95% by weight (that is, the inorganic filler is present in the resin composition in an amount of from 70 to 1% by weight, preferably from 30 to 5% by weight), based on the total of the polyether copolymer and the inorganic filler.

If the amount of the inorganic filler is less than 1% by weight the inorganic filler will not show the effect of the addition thereof sufficiently, and on the other hand, if it is more than 70% by weight, the moldability of the resin composition will be deteriorated.

The resin composition of the present invention comprising the polyether copolymer, the heat-resistant thermoplastic resin and the inorganic filler contains the polyether copolymer in an amount of from 10 to 90% by weight, based on the total of the polyether copolymer and the heat-resistant thermoplastic resin, and the inorganic filler in an amount of from 1 to 50% by weight, preferably from 15 to 40% by weight, based on the total of the polyether copolymer, the heat-resistant thermoplastic resin, and the inorganic filler.

If the amount of the polyether copolymer is less than 10% by weight, the improvement of mechanical strength and the effect of rendering inflammability will be insufficient. On the other hand even if the amount of the polyether copolymer is more than 90% by weight, the effect of adding the polyether copolymer into the thermoplastic resin will not further increase.

Further, even if the mixing ratio between the polyether copolymer and the heat-resistant thermoplastic resin is within the above-described range, the addition of the inorganic filler in an amount of less than 1% by weight will not show sufficient effect, and on the other hand, the addition in an amount of more than 50% by weight will hinder the moldability of the resin composition.

In each resin composition of the present invention, additives other than the above-described essential components may also be added according to demand, so far as the achievement of the object of the present invention is not hindered. Such additives include other resins and various additives including those which have been ordinarily added into the conventional heat-resistant thermoplastic resin compositions. Typical examples of the additives include plasticizers, antioxidants, UV absorbers lubricants, release agents, and colorants.

The resin composition of the present invention is obtained by mixing the polyether copolymer, the heat-resistant thermoplastic resin and/or the inorganic filler in the above-described ratios respectively, or by further mixing other additives described above, according to demand.

The order in which the above-described components are added is not particularly limited, and all of the components may be mixed at the same time, or they may be mixed in steps. For instance the resin composition of the present invention comprising the polyether copolymer the heat-resistant thermoplastic resin, and the inorganic filler may be prepared by a method in which the polyether copolymer, the heat-resistant thermoplastic resin, and the organic filler are mixed at the same time, or by a method in which the polyether copolymer and the heat-resistant thermoplastic resin are mixed to form the resin composition of the present invention comprising the polyether copolymer and the heat-resistant thermoplastic resin, and then the inorganic filler is further mixed into the obtained resin composition, or by a method in which the polyether copolymer is mixed into a composition prepared by mixing the heat-resistant thermoplastic resin and the inorganic filler.

In the preparation of the resin compositions of the present invention the mixing of the polyether copolymer, the heat-resistant thermoplastic resin and/or the inorganic filler or the mixing of these components and other additives described above may be carried out by using various techniques including those generally used for the preparation of known heat-resistant thermoplastic resin compositions. It is generally desirable to knead these components by using various kneaders or various extruders while the components are heated to a temperature at which they are in a melted state thereby enabling them to be mixed sufficiently uniformly.

The temperature of kneading is not particularly limited because it depends on the kinds of the resins used the composition, and other conditions, but a temperature of from about 300 to about 500° C., preferably from about 350° C. to 430° C., is generally appropriate.

The appropriate range of the time of the melt kneading is generally from about 1 to about 10 minutes, preferably from about 2 to about 5 minutes.

The melt kneading may be carried out by using apparatuses of various systems and generally, the preferred are a kneader or an extruder in which biaxial screws turn in one direction or in different directions and a uniaxial screw extruder in which a screw turns and performs a reciprocating motions back and forth simultaneously.

The resin composition thus obtained is formed into pellets, according to demand, and then formed into a molded articles of desired shapes by thermo-compression molding, such as injection molding.

The molding may be carried out separately after the prepared resin composition is cooled, or may be carried out directly using the resin composition being still in a melted state. Further these method may be used jointly.

Thus obtained resin compositions of the present invention have many advantages in that they excel extremely in various properties including heat resistance (the resistance to thermal decomposition during melt kneading or forming and the heat resistance during their use), mechanical properties such as mechanical strength, chemical resistance, and solvent resistance and exhibit excellent inflammability, and as well have extraordinarily good moldability. The resin compositions of the present invention therefore may be suitable as materials for various polymer molded articles including the parts of machines and electric and electronic apparatuses and instruments.

Heat-Resistant Laminate

The heat-resistant laminate of the present invention is produced by using the polyether copolymer of the present invention, which comprises the repeating units represented by the formula (I) and the repeating units represented by the formula (II), has a molar ratio of (I)/{(I)+(II)} of from 0.1 to 0.8. and has a melt viscosity of at least 500 poise, preferably at least 1,000 poise, as measured at 400° C.

If the melt viscosity is less than 600 poise, the heat resistance and mechanical strength of the heat-resistant laminate may sometimes be insufficient.

From the view point of the heat resistance, mechanical strength, and chemical resistance, the suitable examples of the fibrous reinforcing material to be used in the present invention are glass fiber, carbon fiber, and aromatic polyamide fiber. These may be used individually or in a combination of two or more of them.

The forms of these fibers suitable for the use in the present invention include chopped strand mat, continuous long fiber mat, woven fabric (such as filament fiber woven fabrics, spinning woven fabrics, and stretched woven fabrics), and knotted fabric (such as looped fabrics and jerseys). These fibers of the various forms may be used individually or in a combination of two or more of them.

The heat-resistant laminate of the present invention comprises a layer of the polyether copolymer and a layer of the fibrous reinforcing material. There is no particular limit in the number of each layer, and generally, the heat-resistant laminate is two- or three-layered laminate consisting of one layer of the fibrous reinforcing material and one or two layers of the polyether copolymer covering one or both sides of the layer of the fibrous reinforcing material.

It should be noted that in the heat-resistant laminate of the present invention, the layer of the fibrous reinforcing material may contain the polyether copolymer therein. As described below, the heat-resistant laminate of the present invention is preferably produced by forming using heat and pressure, and in such a case, a portion of the polyether copolymer melted and softened often permeates the layer of the fibrous reinforcing material and solidifies as it is (particularly, in case the layer of the fibrous reinforcing material has rough meshes).

Although the heat-resistant laminate of the present invention may be produced by using any known laminating methods, it is preferable to produce it by means of forming using heat and pressure.

The amount of the polyether copolymer used is generally from 20 to 85% by weight, preferably from 30 to 80% by weight, that is, the amount of the fibrous reinforcing material used is generally from 15 to 80% by weight, preferably from 20 to 70% by weight, based on the total of the polyether copolymer and the fibrous reinforcing material, respectively.

If the amount of the polyether copolymer used is less than 20% by weight or more than 85% by weight, the mechanical strength of the heat-resistant laminate may sometimes be decreased.

The production of the heat-resistant laminate of the present invention by means of forming using heat and pressure may be carried out by using any one of the following three methods.

(1) A method in which powder or pellets of the polyether copolymer is distributed over the surface of the mat or woven fabric of the fibrous reinforcing material, followed by forming them using heat and pressure.

(2) A method in which after the pellets of the polyether copolymer are extrusion molded or compression molded to form a sheet, the sheet is laminated with a mat or woven fabric of the fibrous reinforcing material, followed by forming the laminate using heat and pressure.

(3) A method in which the above two methods are combined.

The heat-resistant laminate of the present invention has the specific structure described above and, therefore, it excels not only in heat resistance but also in mechanical strength, electrical properties, inflammability, chemical resistance, and moldability.

Polyether Copolymer Fiber

One of the most important points of the polyether copolymer fiber of the present invention is that it is produced by using the polyether copolymer which comprises the repeating units represented by the formula (I) and the repeating units represented by the formula (II), has a molar ratio of (I)/{(I)+(II)} of from 0.1 to 0.8, preferably from 0.1 to 0.5, and has a melt viscosity of at least 500 poise, preferably from 5,000 to 30,000 poise, as measured at 400° C.

If the molar ratio of the repeating units represented by the formula (I), namely the molar ratio of (I)/{(I)+(II)} is less than 0.1, the melting point of the polyether copolymer will be too high, and the melt viscosity will be too high, resulting in the decrease of processability (efficiency of melt spinning). Further, in case the polyether copolymer fiber is produced by using a resin composition prepared by adding various additives into the polyether copolymer, it sometimes becomes difficult to melt mix the polyether copolymer with the additives, thereby making the preparation of a uniform resin composition and a uniform fiber difficult. If the molar ratio of repeating units represented by the formula (I) is more than 0.8, the crystallinity of the polyether copolymer will be insufficient, and the heat resistance, mechanical strength, solvent resistance, and chemical resistance of the resulting fiber will be decreased.

In the present invention, the polyether copolymer may contain other repeating units in ratios which do not hinder the achievement of the object of the present invention.

In the present invention the polyether copolymers of various structures may be used individually or two or more of them may be used in a form of a mixture or composition according to demand.

The polyether copolymer fiber of the present invention is produced by melt spinning the polyether copolymer at a temperature (melt spinning temperature) higher than the melting point thereof (hereinafter, the melting point sometimes will be represented by Tm in °C. units) by from 10 to 70° C., that is, in the temperature range of from (Tm+10) °C. to (Tm+70) °C.

If the melt spinning temperature is lower than (Tm+10) °C., the polyether copolymer will be difficult to spin, and the moldability during the spinning will be decreased. On the contrary, if it is higher than (Tm+70) °C., the flowability of the polyether copolymer during the spinning will increases too high to spin it into a fiber without trouble, and such a high melt spinning temperature may bring other troubles such as decomposition of the spinning material.

Herein, melt spinning temperature means the temperature of the body of the apparatus for spinning which has been heated during the spinning for melting the polyether copolymer, and the temperature of the spinning nozzle from which the spun fiber comes out may be adjusted separately from the melt spinning temperature. Though the temperature of the spinning nozzle should not always be adjusted to the above-described range of from (Tm+10) °C. to (Tm+70) °C. and may be selected according to other conditions it is generally desirable to adjust it lower than the melt spinning temperature by about from 5 to about 20° C.

The spinning generally is carried out by using only one kind of the polyether copolymer, but, according to demand, two or more kinds of the polyether copolymers may be used for the spinning in a form of a mixture or a composition.

Further the polyether copolymer to be used for the spinning may contain other resins and additives so far as the achievement of the object of the present invention is not hindered.

Various kinds of spinning apparatuses including those commercially available may be used so far as they are equipped with heating means capable of adjusting the melt spinning temperature to the above-described range, and the adoption and adjustment of the spinning apparatus depend on the fiber desired For example, melt extruding apparatus capable of increasing the melt spinning temperature to about 500° C. is applicable.

The kind of the spinning nozzle is not particularly limited and may be selected from various ordinary ones including a nozzle with single hole and a nozzle with multiple holes (including those for spinning single yarn or for fiber in a form of multiple yarn) according to the purpose.

There is also no particular limit in the methods of cooling and winding the spun fiber, and the cooling and the winding may be carried out by using various techniques including known techniques and the technique and conditions to be used may be selected according to the purpose.

For instance when a fiber the single yarn of which has a fiber thickness of at least 1,000 d (denier). it is desirable to employ a method in which the fiber coming out from a spinning nozzle is passed through a liquid bath for cooling arranged directly under the spinning nozzle to solidify the fiber, followed by winding the solidified fiber on a winder such as a torque winder, and when a fiber the single yarn of which has a fiber thickness of at most 1,000 d is spun, a method of cooling the fiber in the air may be suitably used.

In order to control the cooling speed according to demand, it is suitable to arrange a heating apparatus, such as a heating tube, next to the spinning nozzle so that the fiber coming out from the spinning nozzle is passed through the heating apparatus.

The polyether copolymer fiber of the present invention, depending on the purpose of its use, does not always need after treatments, such as stretching treatment, following to the above-described melt spinning, but it is generally desirable to subject it al least to stretching treatment. The reason is that an appropriate stretching treatment further improves the mechanical properties, such as mechanical strength, of the obtained fiber.

The stretching treatment is desirably carried out at a temperature higher than the glass transition temperature (Tg) of the polyether copolymer used by from 10 to 60° C. If the stretching temperature is lower than (Tg+10) °C., the stretching cannot be performed efficiently and on the other hand, if it is carried out at a temperature higher than (Tg+60) °C. fluffing or lapping may occur, and stable stretching cannot be expected.

It is desirable to stretch lhe fiber at a draw ratio of at least 1.5, preferably from 2 to 10.

If the draw ratio is less than 1.5, sufficient effect of stretching cannot be expected, and in particular, the mechanical properties including tensile strength cannot be improved sufficiently.

It is generally desirable to subject the stretched fiber to heating treatment after the stretching treatment.

The heating treatment is generally carried out at a temperature higher than the crystallizing temperature of the polyether copolymer and lower than the melting point thereof, with tension or without tension according to demand.

Subjecting the stretched fiber to the heating treatment further improves the strength of the fiber.

The stretching treatment and the heating treatment may be combined with the melt spinning to carry out these operations continuously.

Thus, the polyether copolymer fiber of the present invention is obtained.

The polyether copolymer fiber of the present invention not only excels in heat resistance and mechanical properties including mechanical strength such as tensile strength but also has other advantages such as excellent solvent resistance and chemical resistance. Therefore, it is suitable for various application fields of polymer fiber, such as the materials for composite materials and the materials of woven fabric and knitted fabric.

Polyether Copolymer Film

One of the most important points of the polyether copolymer film of the present invention is that the polyether copolymer to be used as a resin material comprises the repeating units represented by the formula (I) and the repeating units represented by the formula (II) and has a molar ratio, (I)/{(I) (II)}, of from 0.1 to 0.8, preferably from 0.1 to 0.5.

If the molar ratio of the repeating units represented by the formula (I), namely the molar ratio of (I)/{(I)+(II)}, is less than 0.1, the melting point of the polyether copolymer will be too high, and the melt viscosity will be too high, resulting in a decrease in processability. If the ratio of the repeating units represented by the formula (I) is more than 0.8, the crystallinity will be insufficient, resulting not only in a decrease in heat resistance but also in a decrease in mechanical strength, solvent resistance, and chemical resistance.

The polyether copolymer may contain other repeating units as far as the achievement of the object of the present invention is not hindered.

The polyether copolymer to be used for producing the polyether copolymer film of the present invention has a melt viscosity of at least 500 poise, preferably at least 1,000 poise, as measured at 400° C., and those having a melting point less than 500 poise is not sufficient in heat resistance and mechanical strength. The polyether copolymer preferably has a melt viscosity of from 5,000 to 30,000 poise.

In the present invention, the polyether copolymers of various kinds may be used individually or in a combination of two or more of them as a mixture or a composition.

The polyether copolymer film of the present invention is produced by forming the polyether copolymer at a temperature higher than the melting point (Tm) thereof by from 10 to 100° C., namely from (Tm+10) °C. to (Tm+100) °C., preferably from (Tm+30) °C. to (Tm+70) °C.

If the forming temperature is lower than (Tm+10) °C., processability will be decreased. On the other hand, if it exceeds (Tm+100) °C., the melt viscosity of the polyether copolymer during film forming will be too low to perform the forming of the film without problem, and more problems, such as the decomposition of the material used, may occur.

The polyether copolymer to be used for the film forming may contain other resins or additives so far as the achievement of the object of the present invention is not hindered.

The forming of the film may carried out by using the method ordinarily used, including pressing and extrusion.

After the forming of the film, the polyether copolymer film of the present invention may be subjected to after treatments, such as stretching treatment and heating treatment. It is generally desirable to subject it at least to stretching treatment.

Proper stretching treatment further improves the mechanical properties, such as mechanical strength, of the obtained film.

It is generally preferable to carry out the stretching treatment at a temperature not higher than the melting point of the polyether copolymer uniaxially or biaxially.

If the stretching temperature is higher than the melting point, the stretching cannot always be performed stably.

The stretching is desirably carried out at a draw ratio of from 1.5 to 10, preferably from 2 to 5.

If the draw ratio is less than 1.5, sufficient effect of the stretching cannot be expected, and in particular, mechanical properties such as tensile strength cannot be improved sufficiently.

After the stretching treatment, it is desirable to subject the stretched film to heating treatment.

The heating treatment is carried out one or several times at a temperature higher than the glass transition temperature of the polyether copolymer and lower than the melting point thereof, with or without tension according to demand.

The heating treatment of the stretched film further improves the strength of the film, in case a film not stretched is subjected to the heating treatment, it is desirable to carry out the heating treatment at a temperature somewhat higher than the glass transition temperature of the polyether copolymer used.

Thus obtained polyether copolymer film not only excels in heat resistance and mechanical properties such as tensile strength but also has other advantages including high solvent resistance, high chemical resistance, and excellent inflammability. Therefore, the polyether copolymer film of the present invention is useful in the fields of electric and electronic apparatuses and instruments and machine parts.

The present invention will be described in more detail with reference to the following Examples. These Examples, however, are not to be construed to limit the scope of the invention.

EXAMPLES 1 TO 40 AND COMPARATIVE EXAMPLES 1 TO 19

Example 1

Into a 300-ml reactor equipped with a Dean & Stark trap filled with toluene, a stirrer, and an argon gas inlet charged were 2.752 g (0.016 mol) of 2,6-dichlorobenzonitrile, 7.366 g (0.04 mol) of 4,4'-biphenol, 6.634 g (0.048 mol) of potassium carbonate, and 80 ml of N-methyl-2-pyrrolidone as a solvent, were then heated from the room temperature up to 195° C. in an hour while argon gas was being blown therein. After the temperature was increased to 195° C., a small amount of toluene was added to remove the generated water by azeotrope.

Subsequently, after reaction was carried out for 30 minutes at 195° C. a solution of 7.736 g (0.024 mol) of 1,4-bis(4'-fluorobenzoyl)benzene dissolved in 80 ml of N-methyl-2-pyrrolidone was added, and the reaction was further carried out for an hour.

After the conclusion of the reaction, the product was pulverized by using a blender produced by Warning Inc., and the pulverized product was washed with water and methanol, in the order, and dried, to obtain 15.7 g of a product in a state of white powder.

The infrared absorption spectrum analysis of the obtained product showed an absorption at 2,220 cm$^{-1}$ due to nitrile groups, an absorption at 1,650 cm$^{-1}$ due to carbonyl groups, and an absorption at 1,240 cm$^{-1}$ due to ether bonds.

From these results and the results of elementary analysis, the product was identified to be a polyether copolymer having the following chemical structure. The yield was 100%.

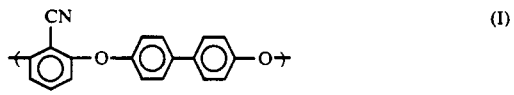

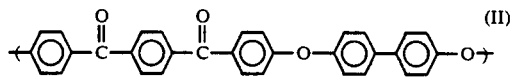

Copolymer composition (molar ratio)

(I)/{(I)+(II)}=0.4

The melt viscosity (the viscosity under no shearing stress) at 400° C. of the polyether copolymer was measured to be 22,000 poise as shown in Table 1. With respect to the thermal properties of the polyether copolymer, it had a glass transition temperature of 192° C., a melting point of 352° C., and a temperature for onset of thermal decomposition of 560° C. (in the air, with a weight reduction by 5%).

When the solvent resistance of the polyether copolymer was investigated by using a press film formed at 400° C., the film was insoluble in acetone, ethanol, toluene, and xylene. With regard to the chemical resistance, the film was not corroded with any one of hydrochloric acid, nitric acid, and sodium hydroxide, When the press film was exposed to the flame of a lighter, the fire went out merely by moving the flame of the lighter away, and melt-dropping did not occur. It shows that the polyether copolymer has good inflammability.

Further, the polyether copolymer was injection molded to obtain a test piece, and the tensile strength, the tensile modulus, and the elongation percentage of the test piece were measured according to ASTM D-638.

The results were as follows.

| | |
|---|---|
| Tensile strength | 1,000 kg/cm$^2$ |
| Tensile modulus | 33,000 kg/cm$^2$ |

-continued

| Elongation percentage | 70% |
|---|---|

Example 2

The same procedure of Example 1 was repeated with the exception that the ratio of 2,6-dichlorobenzonitrile to 1,4-bis(4'-fluorobenzoyl)benzene was changed to be the former: the latter=0.45:0.55, to obtain the polyether copolymer having the following chemical structure.

[Structure I: CN-substituted phenyl-O-biphenyl-O] (I)

[Structure II: phenyl-CO-phenyl-CO-phenyl-O-biphenyl-O] (II)

Copolymer composition (molar ratio)

(I)/{(I)+(II)}=0.45

The measured values of the properties of the polyether copolymer are shown in Table 1.

Example 3

The same procedure of Example 1 was repeated with the exception that the ratio of 2,6-dichlorobenzonitrile to 1,4 bis(4'-fluorobenzoyl)benzene was changed to be the former: the latter=0.35:0.65, to obtain the polyether copolymer having the following chemical structure.

[Structure I] (I)

[Structure II] (II)

Copolymer composition (molar ratio)

(I)/{(I)+(II)}=0.35

The measured values of the properties of the polyether copolymer are shown in Table 1.

Example 4

The same procedure of Example 1 was repeated with the exception that the ratio of 2,6-dichlorobenzonitrile to 1,4-bis(4'-fluorobenzoyl)benzene was changed to be the former: the latter=0.7:0.3, to obtain the polyether copolymer having the following chemical structure.

[Structure I] (I)

[Structure II] (II)

Copolymer composition (molar ratio)

(I)/{(I)+(II)}=0.7

The measured values of the properties of the polyether copolymer are shown in Table 1.

Example 5

In the same reactor as that used in Example 1 charged were 2.064 g (0.012 mol) of 2,6-dichlorobenzonitrile, 7.448 g (0.04 mol) of 4,4'-biphenol, 9.025 g (0.028 mol) of 1,4-bis(4'-fluorobenzoyl)benzene, 6.081 g (0.044 mol) of anhydrous potassium carbonate, and 80 g of diphenylsulfone as a solvent, and were allowed to react for 45 minutes at 190° C. and then for 20 minutes at 250° C. and further for an hour at 330° C.

After the conclusion of the reaction, the product was pulverized in acetone by using a blender and was then washed with acetone, water, and acetone, in the order, to obtain 16.4 (Yield: 99%) of a copolymer in a state of a white powder).

The infrared absorption spectrum of the obtained copolymer was the same as that of the copolymer obtained in Example 1, and from the result and the result of elementary analysis, the copolymer was identified to be a polyether copolymer having the following chemical structure.

[Structure I] (I)

[Structure II] (II)

Copolymer composition (molar ratio)

(I)/{(I)+(II)}=0.3

The melt viscosity at 400° C. of the polyether copolymer was measured to be 26,000 poise as shown in Table 1 and the polyether copolymer had a glass transition temperature of 191° C., a melting point of 378° C., and a temperature for onset of thermal decomposition of 561° C.

The polyether copolymer exhibited the same solvent resistance, chemical resistance, and inflammability as those of the polyether copolymer obtained in Example 1.

Example 6

The same procedure of Example 5 was repeated with the exception that the ratio of 2,6-dichlorobenzonitrile to 1,4-bis(4'-fluorobenzoyl)benzene was changed to be the former: the latter=0.2:0.8, to obtain the polyether copolymer having the following chemical structure.

[Structure I] (I)

[Structure II] (II)

Copolymer composition (molar ratio)

(I)/{(I)+(II)}=0.2

The measured values of the properties of the polyether copolymer are shown in Table 1.

EXAMPLE 7

The same procedure of Example 5 was repeated with the exception that the ratio of 2,6-dichlorobenzonitrile to 1,4-bis(4'-fluorobenzoyl)benzene was changed to be the former: the latter=0.15:0.85, to obtain the polyether copolymer having the following chemical structure.

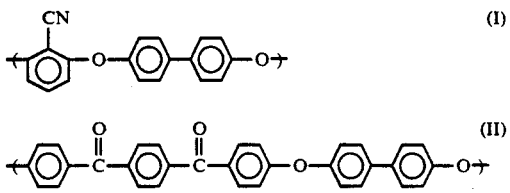

Copolymer composition (molar ratio)

(I)/{(I)+(II)}=0.15

The measured values of the properties of the polyether copolymer are shown in Table 1.

Comparative Example 1

The procedure of Example 5 was repeated with the exception that equimolar quantities of 4,4'-biphenol and 1,4-bis(4'-fluorobenzoyl)benzene were used without using 2,6-dichlorobenzonitrile and the reaction was carried out, in order, for 45 minutes at 190° C. for 20 minutes at 250° C., for an hour at 330° C., and for an hour at 370° C.

The obtained polymer was identified to have the following structural units.

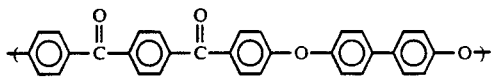

As shown in Table 1, the polymer had a large melt viscosity of 96,000 poise at 420° C., a glass transition temperature of 184° C., a melting point of 412° C., and a temperature for onset of thermal decomposition of 558° C. and was difficult to form.

to 195° C. in an hour while argon gas was blown therein.

After the temperature was raised to 195° C., a small amount of toluene was added to remove the generated water by azeotrope.

Subsequently after reaction was carried out for 30 minutes at 195° C., a solution of 169.2 g (0.525 mol) of 1,4-bis(4'-fluorobenzoyl)benzene dissolved in 1.5 l of N-methyl-2-pyrrolidone was added, and the reaction was further carried out for an hour.

After the conclusion of the reaction, the product was pulverized by using a blender produced by Warning Inc., and the pulverized product was washed with acetone, methanol, water, and acetone, in the order, and was then dried, to obtain 304.0 g (Yield: 98%) of a copolymer being in a state of a white powder and having the following structure.

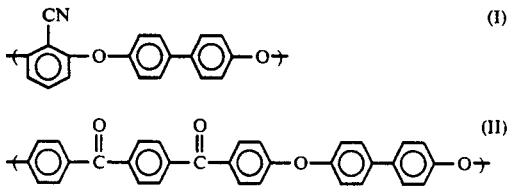

Copolymer composition (molar ratio)

(I)/{(I),(II)}=0.3

When the properties of the obtained polyether copolymer were measured it had a melt viscosity (the viscosity under no shearing stress) of 13,000 poise at 400° C. a glass transition temperature of 190° C., a melting point of 384° C., a crystallizing temperature of 230° C., and a temperature for onset of thermal decomposition of 565° C. (in the air, with a weight reduction by 5%).

8.(2) The Preparation of Resin Composition

Pellets of the polyether copolymer prepared in 8.(1) and a polycarbonate (Trademark: IDEMITSU CARBONATE A 2500 produced by Idemitsu Petrochemical Co., Ltd.) were mixed in a weight ratio of 50:50, and the mixture was melt-kneaded at 365° C. for three minutes

TABLE 1

| | The molar ratio of the repeating units (I) [(I)/{(I) + (II)}] | Glass transition temperature (°C.) | Melting point (°C.) | Temperature for onset of thermal decomposition (°C.) | Melt viscosity (poise) |
|---|---|---|---|---|---|
| Example 1 | 0.4 | 192 | 352 | 560 | 22,000 |
| Example 2 | 0.45 | 196 | 352 | 560 | 39,000 |
| Example 3 | 0.35 | 192 | 374 | 560 | 13,000 |
| Example 4 | 0.7 | 200 | 350 | 555 | 22,000 |
| Example 5 | 0.3 | 191 | 378 | 561 | 26,000 |
| Example 6 | 0.2 | 188 | 390 | 560 | 28,000 |
| Example 7 | 0.15 | 187 | 398 | 560 | 19,000 |
| Comparative Example 1 | 0 | 184 | 412 | 558 | 96,000* |

*The value measured at 420° C.

Example 8

8.(1) The Preparation of Polyether Copolymer

Into a 5-l reactor equipped with a Dean & Stark trap, a stirrer, and an argon gas inlet charged were 38.70 g (0.225 mol) of 2,6-dichlorobenzonitrile, 139.66 g (0.75 mol) of 4,4'-biphenol, 124.39 g (0.9 mol) of potassium carbonate, and 1.5 l of N-methyl-2-pyrrolidone, and the temperature was raised from the room temperature up and was extrusion molded by using an extruder having an internal diameter of 30 mm, to obtain a pelletized resin composition. The pelletized resin composition was then injection molded to obtain test pieces.

The heat distortion temperature and the oxygen index of the resin composition were measured by using the test pieces according to ASTM D-648 and ASTM D-286, respectively.

The larger the oxygen index is, the higher the inflammability of the resin composition is.

The results are shown in Table 2.

Examples 9 to 13

The preparation of resin compositions and the forming of test pieces were carried out in the same manner as in Example 8.(2), with the exception that the polyether copolymer prepared in Example 8.(1) was used in Examples B and 11 to 13, a polyether copolymer, which was prepared in the same manner as in Example 8.(1) with the exception that the amounts of the reaction materials were changed so that the polyether copolymer had a molar ratio of the repeating units (I) to the repeating units (II) of 40:60, was used in Example 10, the heat-resistant thermoplastic resins shown in Table 2 were used in place of the polycarbonate, and the mixing ratios were changed to those shown in Table 2. The heat distortion temperatures and the oxygen indexes of the resin compositions were measured by using the obtained test pieces in the same manner as in Example 8.(2).

The results are shown in table 2.

Comparative Examples 2 To 6

The heat distortion temperatures and the oxygen indexes of the heat-resistant thermoplastic resins shown in Table 2, which were not mixed with any polyether copolymer, were measured in the same manner as in Example 8.(2).

The results are shown in Table 2.

Example 14

The same polyether copolymer as that used in Example 10 and glass fiber having a mean fiber diameter of 10 μm and a mean fiber length of 3 mm (Trademark: PX-1 produced by Asahi Fiberglass Co., Ltd.) were mixed in a weight ratio of 70:30, and the mixture was kneaded at 360° C., extruded by using an extruder, and cut, to obtain a pelletized resin composition. The obtained pelletized resin composition was injection molded to obtain test pieces.

The mechanical properties including mechanical strength of the resin composition were measured by using the test pieces.

The results are shown in Table 3.

Example 15

The same polyether copolymer as that used in Example 10 and carbon fiber having a mean fiber diameter of 9 μm and a mean fiber length of 10 mm (Trademark: TORAYCA T-300, produced by TORAY Industries, Inc.) were mixed in a weight ratio of 70:30, and the mixture was kneaded at 350° C., extruded by using an extruder, and cut, to obtain a pelletized resin composition. The obtained pelletized resin composition was injection molded to obtain test pieces.

The mechanical properties including mechanical strength of the resin composition were measured by using the test pieces.

The results are shown in Table 3.

Examples 16 to 18

The preparation of resin compositions and the production of test pieces were carried out in the same manner as in Example 8.(2), with the exception that the polyether copolymer prepared in Example 8.(1), the heat-resistant thermoplastic resins shown in Table 4, and the inorganic fillers shown in table 4 were mixed in the ratios shown in Table 4.

The heat distortion temperatures and the oxygen indexes of the resin compositions were measured by using the obtained test pieces in the same manner as in Example 8.(2).

The results are shown in Table 4.

Comparative Examples 7 to 9

The preparation of resin compositions and test pieces and the measurements of heat distortion temperatures and oxygen indexes were carried out in the same procedure as in Example 8.(2) with the exception that the ingredients shown in Table 4 were mixed in the ratios shown in Table 4.

The results are shown in Table 4.

TABLE 2

| | Heat resistant thermoplastic resin (wt %) | | Polyether copolymer | | Heat distortion temperature (°C.) | Oxygen index (—) |
|---|---|---|---|---|---|---|
| | | | The molar ratios of repeating units (I):(II) | Mixing ratio (wt %) | | |
| Example 8 | PC | 50 | 30:70 | 50 | 156 | 40 |
| Comparative Example 2 | PC | 100 | — | — | 131 | 30 |
| Example 9 | PEEK | 50 | 30:70 | 50 | 154 | 47 |
| Example 10 | PEEK | 50 | 40:60 | 50 | 160 | 47 |
| Comparative Example 3 | PEEK | 100 | — | — | 145 | 35 |
| Example 11 | PES | 50 | 30:70 | 50 | 183 | 41 |
| Comparative Example 4 | PES | 100 | — | — | 205 | 38 |
| Example 12 | PEI | 50 | 30:70 | 50 | 216 | 47 |
| Comparative Example 5 | PEI | 100 | — | — | 200 | 47 |
| Example 13 | Polyester | 20 | 30:70 | 80 | 278 | 45 |
| Comparative Example 6 | Polyester | 100 | — | — | 293 | 39 |

PC: Polycarbonate (Trademark: IDEMITSU POLYCARBONATE A2500, produced by Idemitsu Petrochemical Co., Ltd.)
PEEK: Polyester etherketone (Trademark: Victrex PEEK 450G, produced by I. C. I. Ltd.)
PES: Polyethersulfone (Trademark: Victrex 200P, produced by I. C. I. Ltd.)
PEI: Polyether imide (Trademark: ULTEM 1000, produced by General Electric Company)
Polyester: Wholly aromatic polyester (Tradename: SUMIPLOY E-2000, produced by Sumitomo Chemical Co., Ltd.)

TABLE 3

|  | Testing method | Measuring temperature | Example 14 | Example 15 |
| --- | --- | --- | --- | --- |
| Tensile strength | ASTM | 23° C. | 1,500 | 2,480 |
| (kg/cm$^2$) | D-638 | 250° C. | 350 | 840 |
| Tensile modulus | ASTM | 23° C. | 69,000 | 74,000 |
| (kg/cm$^2$) | D-638 | 250° C. | 24,000 | 17,000 |
| Elongation | ASTM | 23° C. | 1.5 | 1.9 |
| (%) | D-638 | | | |
| Bending strength | ASTM | 23° C. | 2,400 | 3,500 |
| (kg/cm$^2$) | D-790 | 250° C. | 540 | 1,060 |
| Bending modulus | ASTM | 23° C. | 61,000 | 188,000 |
| (kg/cm$^2$) | D-790 | 250° C. | 26,000 | 31,000 |
| Izod impact strength | ASTM | | 12*[1] | 14.3*[1] |
| (kg · cm/cm) | D-256 | | 41*[2] | 80*[2] |
| Heat distortion | ASTM | — | 360 | 380 |
| temperature (°C.) | D-648 | | | |
| Load 18.6 kg | | | | |

*[1] notched type
*[2] without notch

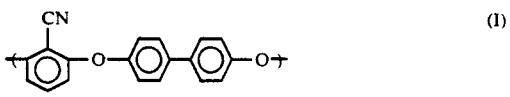

Copolymer composition (molar ratio)

(I)/{(I)+(II)} = 0.4

When the properties of the polyether copolymer were measured, it had a melt viscosity (the viscosity under no shearing stress) of 22,000 poise at 400° C., a glass transition temperature of 192° C., a melting point of 352° C., and a temperature for onset of thermal de-

TABLE 4

|  | Heat resistant thermoplastic (wt %) | Polyether copolymer | | Inorganic filler (wt %) | Heat distortion temperature (°C.) | Oxygen index (—) |
| --- | --- | --- | --- | --- | --- | --- |
|  |  | The molar ratios of repeating units (I):(II) | Mixing ratio (wt %) |  |  |  |
| Example 16 | PPS 35 | 30:70 | 35 | GF 28 TiO$_2$ 2 | 318 | 58 |
| Comparative Example 7 | PPS 60 | — | — | GF 40 | 260 | 50 |
| Example 17 | PET 35 | 30:70 | 35 | GF 28 TiO$_2$ 2 | 298 | 59 |
| Comparative Example 8 | PET 70 | — | — | GF 30 | 224 | 41 |
| Example 18 | PEEK 35 | 30:70 | 35 | CF 30 | >300 | 62 |
| Comparative Example 9 | — | 30:70 | 100 | — | 203 | 42 |

PPS: Polyphenylenesulfide (Trademark: LYTON R-4, produced by Phillips Petroleum)
PET: Polyethyleneterephthalate (Trademark: LINITE 530, produced by DuPont Far East)
GF: Glass fiber (Trademark: PX-1, produced by Asahi Fiberglass Co., Ltd.) mean fiber diameter: 10 μm, mean fiber length: 3 mm)
CF: Carbon fiber (Trademark: TORAYCA T300, produced by TORAY Industries, Inc.)
TiO$_2$: Trademark: P-25, produced by Aerogil)

Example 19

The Preparation of Polyether Copolymer

Into a 50-1 reactor equipped with a Dean & Stark trap filled with toluene, a stirrer, and an argon gas inlet charged were 516.0 g (3 mol) of 2,6-dichlorobenzonitrile, 1396.6 g (7.5 mol) of 4,4'-biphenol, 1243.9 g (9 mol) of potassium carbonate, and 15 l of N-methyl-2-pyrrolidone and the temperature was raised from the room temperature up to 195° C. in an hour while argon gas was blown therein.

After the temperature was raised to 195° C., a small amount of toluene was added to remove the generated water by azeotrope.

Subsequently, after reaction was carried out for 30 minutes at 195° C., a solution of 1450.5 g (4.5 mol) of 1,4-bis(4'-fluorobenzoyl)benzene dissolved in 15 l of N-methyl-2-pyrrolidone was added in the reaction mixture, and the reaction was further carried out for an hour.

After the conclusion of the reaction, the product was pulverized by using a blender (produced by Warning Inc.), and the pulverized product was then washed with water and methanol, in the order, and was dried, to obtain 2784.0 g (Yield: 100%) of a copolymer being in a state of a white powder and having the following structure.

composition of 56° C. (in the air, with a weight reduction by 5%).

The Production of Heat-Resistant Laminate and Valuation Tests

After the powder of the polyether copolymer obtained above was distributed uniformly in a flat plate mold of 50×50 mm, a carbon fiber mat (Trademark: TORAYCA MAT B0030 produced by TORAY Industries, Inc.) was placed thereon, and the same powder of the polyether copolymer was further distributed on the mat uniformly.

The amounts of the polyether copolymer and the carbon fiber mat used were 80% by weight and 20% by weight, respectively.

Subsequently, after the mold was closed and pressed at 400° C. under the pressure of 10 kg/cm$^2$ for 5 minutes, and it was transferred into a cooling press where it was retained at 200° C. for five minutes, to obtain a laminate of 1 mm in thickness and 50 mm both in length and in width.

The tensile strength, the elongation percentage, the tensile modulus, the bending strength, the bending modulus, the heat distortion temperature, the surface hardness, the sliding properties, the volume resistivity, the dielectric constant, and the dielectric loss tangent of the laminate were measured.

The results are shown in Table 5.

When the laminate was examined as to the chemical resistance, it was insoluble in each of the solvents including acetone, toluene, xylene, chloroform, and methylene chloride, and it was not corroded with any one of nitric acid, hydrochloric acid, dichloroacetic acid, trifluoroacetic acid, sodium hydroxide, and potassium hydroxide, with the exception that concentrated sulfuric acid caused some swelling.

With regard to inflammability, when a slice of the laminate was exposed to the flame of a lighter for 10 seconds and the flame of the lighter was then moved away the fire went out immediately, and melt-dropping did not occur. It shows that the laminate has good inflammability.

Example 20

The production of a laminate and the valuation tests thereof were carried out in the same manner as in Example 19 with the exception that a glass long fiber mat (Trademark: CSM-M9600 produced by Asahi Fiberglass Co., Ltd.) was used in place of the carbon fiber.

The results are shown in Table 5.

The obtained laminate exhibited the same chemical resistance and inflammability as those of the laminate obtained in Example 19.

Example 21

The preparation of a polyether copolymer, the production of a laminate, and the valuation tests thereof were carried out in the same manner as in Example 19 with the exception that a mixture of 90% by weight of the powder of the polyether copolymer and 10% by weight of carbon fiber having a mean fiber length of 3 mm was used in place of the powder of the polyether copolymer. The results are shown in Table 5.

The obtained laminate exhibited the same chemical resistance and inflammability a those of the laminate obtained in Example 19.

Comparative Example 10

The production of a laminate and the valuation tests thereof were carried out in the same manner as in Example 19 with the exception that pellets of a polyetheretherketone (Trademark: Victrex PEEK 450G, produced by I.C.I. Ltd.) were used in place of the polyether copolymer obtained in Example 19.

The results are shown in Table 5.

Comparative Example 11

The production of a laminate and the valuation tests thereof were carried out in the same manner as in Example 20 with the exception that pellets of a polyetheretherketone (Trademark: Victrex PEEK 450G, produced by I.C.I. Ltd.) were used in place of the polyether copolymer obtained in Example 19.

The results are shown in Table 5.

The measurements in the valuation tests were conducted as follows.

| | |
|---|---|
| Tensile strength, Tensile modulus, and Elongation percentage | according to ASTM D-638 |
| Bending strength and Bending modulus | according to ASTM D-790 |
| Heat distortion temperature | according to ASTM D-648 |
| Rockwell hardness (M scale) | according to ASTM D-785 |
| Coefficient of kinetic friction | the partner member: S45C velocity: 0.6 m/sec pressure: 20 kg/cm$^2$ |
| Volume resistivity | according to ASTM D-275 |
| Dielectric constant | according to ASTM D-150 |
| Dielectric loss tangent | according to ASTM D-150 |

TABLE 5

| No. | Tensile strength (kg/cm$^2$) | Elongation (%) | Tensile modulus (kg/cm$^2$) | Bending strength (kg/cm$^2$) | Bending modulus (kg/cm$^2$) | Heat distortion temperature (°C.) | Rockwell hardness (M scale) | Coefficient of kinetic friction ($\mu$) | Volume resistivity ($\Omega$-cm) | Dielectric constant (1 KHz) | Dielectric loss tangent (1 KHz) |
|---|---|---|---|---|---|---|---|---|---|---|---|
| Example | | | | | | | | | | | |
| 19 | 2,800 | 3 | 55,000 | 3,200 | 91,000 | 360 | 96 | 0.18 | — | — | — |
| 20 | 3,000 | 3 | 52,000 | 3,000 | 95,000 | 360 | 96 | 0.18 | 1.0 × 10$^{16}$ | 3.90 | 0.003 |
| 21 | 3,500 | 3 | 58,000 | 3,600 | 96,000 | 360 | — | — | — | — | — |
| Comparative Example | | | | | | | | | | | |
| 10 | 2,100 | 3 | 53,000 | 2,500 | 100,000 | 300 | 98 | 0.58 | — | — | — |
| 11 | 2,200 | 3 | 52,000 | 2,500 | 110,000 | 300 | 98 | 0.58 | 1.5 × 10$^{16}$ | 3.40 | 0.003 |

Example 22

A polyether copolymer prepared in the same manner as in example 8.(1) was melted by heating it to 400° C. and was then spun by using a spinning nozzle having an internal diameter of 1.0 mm and a length of 1.0 mm at a nozzle temperature of 390° C. Thereafter, the spun fiber was immediately passed through a heating tube of 30 cm in length maintained at 300° C., and was then cooled in the air and wound up at a speed of 120 m/min. to obtain an unstretched fiber of 35 d (unstretched polyether copolymer fiber).

The unstretched fiber was stretched at a stretching temperature of 200° C. by a draw ratio of 2 by using a stretching roller and was then subjected to heating treatment by using a heating plate heater at 240° C., to obtain stretched polyether copolymer fiber.

The tensile strength, the elongation percentage, the knot strength, and the Young's modulus of the stretched polyether copolymer fiber were measured.

The results are shown in Table 6.

These measurement of the properties were conducted according to JIS-L-1013-81.

Example 23

The production of stretched polyether copolymer fiber and the measurements of the properties thereof were carried out in the same manner as in Example 22 with the exception that the draw ratio was changed to 3.

The results are shown in Table 6.

Example 24

The production of stretched polyether copolymer fiber and the measurements of the properties thereof were carried out in the same manner as in Example 22 with the exception that the draw ratio was changed to 4 and the stretching temperature was changed to 210° C.

The results are shown in Table 6.

Example 25

The polyether copolymer prepared in Example 22 was melted by heating it to 400° C. and was then spun by using a spinning nozzle having an internal diameter of 0.45 mm, a length of 1.35 mm, and a hole number of 60. During the spinning, the temperature of the spinning nozzle was adjusted to 390° C. The spun fiber was passed continuously through a heating tube of 300 mm in length set at the outlet of the spinning die and maintained at 300° C., and after cooled in the air, it was wound up at a speed of 150 m/min. to obtain unstretched fiber (unstretched polyether copolymer fiber) of 80 d/60 filaments.

The obtained unstretched fiber was stretched by a draw ratio of 2 at a stretching temperature of 200° C. by using a stretching roller, and was then subjected to heating treatment by using a heating plate heater at a temperature of 240° C., to obtain stretched fiber (stretched polyether copolymer fiber).

The properties of the stretched polyether copolymer fiber were measured in the same manner as in Example 22.

The results are shown in Table 6.

Example 26

The production of stretched polyether copolymer fiber and the measurements of the properties thereof were carried out in the same manner as in Example 25 with the exception that the draw ratio was changed to 3.

The results are shown in Table 6.

Example 27

The production of stretched polyether copolymer fiber and the measurements of the properties thereof were carried out in the same manner as in Example 25 with the exception that the draw ratio was changed to 4 and the stretching temperature was changed to 210° C.

The results are shown in Table 6.

Example 28

28.(1) The Preparation of Polyether Copolymer

A polyether copolymer was prepared in the same manner as in Example 22 with the exception that the molar ratio of the amounts of the 2,6-dichlorobenzonitrile and 1,4-bis(4'-fluorobenzoyl)benzene charged was changed to 4:6 in place of 3:7.

The obtained polyether copolymer consisted of the repeating units (I) and the repeating units (II) shown in Example 8.(1) and had a molar ratio of 0.4:0.6 between the repeating units (I) and the repeating units (II).

When the properties of the polyether copolymer was measured, it had a melt viscosity (the viscosity under no shearing stress) of 14,000 poise at 400° C., a glass transition temperature of 193° C., a crystallizing temperature of 235° C. a melting point of 352° C., and a temperature for onset of thermal decomposition of 570° C. (in the air, with a weight reduction by 5%). It shows that the polyether copolymer has high heat resistance.

28.(2) The Production of Polyether Copolymer Fiber

Polyether copolymer fiber stretched by a draw ratio of 2 was produced in the same manner as in Example 22 with the exception that the polyether copolymer obtained in 28.(1) was used in place of the polyether copolymer obtained in Example 22, the stretching temperature was changed to 210° C., and the temperature of heating treatment was changed to 250° C.

The above-described properties of the stretched polyether copolymer fiber were measured in the same manner as in Example 22.

The results are shown in Table 6.

Example 29

The production of stretched polyether copolymer fiber and the measurements of the properties thereof were carried out in the same manner as in Example 28.(2) with the exception that the draw ratio was changed to 3.

The results are shown in Table 6.

Example 30

The production of stretched polyether copolymer fiber and the measurements of the properties thereof were carried out in the same manner as in Example 28.(2) with the exception that the draw ratio was changed to 4 and the stretching temperature was changed to 220° C.

The results are shown in Table 6.

Example 31

The production of stretched polyether copolymer fiber stretched by a draw ratio of 2 and the measurements of the properties thereof were carried out in the same manner as in Example 25 with the exception that the polyether copolymer prepared in Example 28.(1) was used in place of the polyether copolymer obtained in Example 22, the stretching temperature was changed to 210° C., and the temperature of heating treatment was changed to 250° C.

The results are shown in Table 6.

Example 32

The production of stretched polyether copolymer fiber and the measurements of the properties thereof were carried out in the same manner as in Example 31 with the exception that the draw ratio was changed to 3 and the stretching temperature was changed to 220° C.

The results are shown in Table 6.

Example 33

The production of stretched polyether copolymer fiber and the measurements of the properties thereof were carried out in the same manner as in Example 31 with the exception that the draw ratio was changed to 4 and the stretching temperature was changed to 220° C.

The results are shown in Table 6.

Comparative Example 12

Stretched fiber stretched by a draw ratio of 2 was produced in the same manner as in Example 22 with the exception that a commercial polyetheretherketone (Trademark: Victrex PEEK 450G produced by I.C.I. Ltd., Tm: 340° C., Tg: 144° C., Tc: 190° C.) was used in place of the polyether copolymer obtained in Example 22 and the conditions were changed as shown in Table 6.

The properties of the obtained stretched fiber were measured in the same manner as in Example 22.

The results are shown in Table 6.

Comparative Example 13 AND 14

The production of stretched fiber and the measurements of the properties were carried out in the same manner as in Comparative Example 12 with the exception that the draw ratios were changed to 3 and 4, respectively.

The results are shown in Table 6.

Comparative Example 15

Stretched fiber stretched by a draw ratio of 2 was produced in the same manner as in Example 25 with the exception that a commercial polyetheretherketone (Trademark: Victrex PEEK 450G produced by I.C.I. Ltd.) was used in place of the polyether copolymer obtained in Example 22 and the conditions were changed as shown in Table 6.

The properties of the obtained stretched fiber were measured in the same manner as in Example 22.

The results are shown in Table 6.

Comparative Examples 16 and 17

The production of stretched fiber and the measurements of the properties thereof were carried out in the same manner as in Comparative Example 15 with the exception that the draw ratios were changed to 3 and 4, respectively.

The results are shown in Table 6.

glass transition temperature (Tg), the melting point (Tm), the temperature for onset of thermal decomposition (Td), and the crystallizing temperature (Tc) of each polyether copolymer are shown in Table 7.

TABLE 7

| Polyether copolymer | Preparation Example | | | | |
|---|---|---|---|---|---|
| | 1 | 2 | 3 | 4 | 5 |
| The molar ratio of the repeating units (I) | 0.3 | 0.1 | 0.20 | 0.4 | 0.5 |
| Melt viscosity (400° C.) (Poise) | 13,000 | 9,800 | 15,000 | 23,000 | 25,000 |
| Glass transition temperature (°C.) | 190 | 186 | 187 | 196 | 202 |
| Melting point (°C.) | 384 | 405 | 390 | 357 | 339 |
| The temperature for onset of thermal decomposition (°C.) | 565 | 560 | 562 | 564 | 565 |
| Crytallizing temperature (°C.) | 230 | 193 | 202 | 245 | 260 |

Example 34

A transparent, amorphous film was produced by press forming the polyether copolymer prepared in Preparation Example 1 at 400° C., followed by cooling rapidly the obtained film by introducing it in water. The obtained film had a thickness of 200 μm.

When the properties of the film were measured, it had a tensile strength of 9.5 kg/mm$^2$, a tensile modulus of 220 kg/mm$^2$, an elongation at rupture of 150% and an oxygen index of 35.5. The measurements of tensile strength, tensile modulus, and elongation at rupture were conducted according to ASTM D-882, and the

TABLE 6

| No. | Polyether copolymer The molar ratios of (I):(II) | Draw ratio | Stretching temperature (°C.) | Heating treatment temperature (°C.) | Tensile strength (g/d) | Elongation (%) | Knot strength (g/d) | Young's modulus (kg/mm$^2$) |
|---|---|---|---|---|---|---|---|---|
| Example | | | | | | | | |
| 22 | 30:70 | 2.0 | 200 | 240 | 5.3 | 30 | 3.4 | 900 |
| 23 | 30:70 | 3.0 | 200 | 240 | 5.7 | 29 | 3.7 | 1,000 |
| 24 | 30:70 | 4.0 | 210 | 240 | 6.1 | 20 | 4.1 | 1,050 |
| 25 | 30:70 | 2.0 | 200 | 240 | 5.9 | 31 | 3.8 | 1,040 |
| 26 | 30:70 | 3.0 | 200 | 240 | 6.1 | 24 | 4.0 | 1,150 |
| 27 | 30:70 | 4.0 | 210 | 240 | 6.7 | 15 | 4.4 | 1,100 |
| 28 | 40:60 | 2.0 | 210 | 250 | 6.6 | 40 | 4.3 | 1,000 |
| 29 | 40:60 | 3.0 | 210 | 250 | 7.5 | 35 | 4.7 | 1,050 |
| 30 | 40:60 | 4.0 | 220 | 250 | 7.8 | 28 | 5.0 | 1,200 |
| 31 | 40:60 | 2.0 | 210 | 250 | 7.0 | 31 | 4.8 | 1,000 |
| 32 | 40:60 | 3.0 | 220 | 250 | 8.0 | 27 | 5.3 | 1,200 |
| 33 | 40:60 | 4.0 | 220 | 250 | 8.4 | 20 | 5.4 | 1,250 |
| Comparative Example | | | | | | | | |
| 12 | | 2.0 | 160 | 200 | 3.8 | 24 | 2.5 | 800 |
| 13 | | 3.0 | 160 | 200 | 4.3 | 18 | 2.8 | 840 |
| 14 | | 4.0 | 160 | 200 | 4.7 | 11 | 3.1 | 880 |
| 15 | | 2.0 | 160 | 200 | 4.0 | 22 | 2.6 | 910 |
| 16 | | 3.0 | 160 | 200 | 4.6 | 19 | 3.1 | 950 |
| 17 | | 4.0 | 160 | 200 | 5.2 | 7 | 3.3 | 1,000 |

Preparation Example 1

A polyether copolymer was prepared in the same manner as in Example 8.(1). The properties of the polyether copolymer are shown in Table 7.

Preparation Examples 2 to 5

Polyether copolymers were prepared in the same manner as in Preparation Example 1 with the exception that the ratios of the reaction materials used were changed. The molar ratio of the repeating units represented by the formula (I), the melt viscosity (ηm), the measurements of oxygen index according to ASTM D-2863.

Example 35

A transparent, amorphous film was produced by press forming the polyether copolymer prepared in Preparation Example 1 at 400° C., followed by cooling rapidly the obtained film by introducing it in ice water. The obtained film had a thickness of 200μm. The film was then subjected to heating treatment for one minute at 230° C., to obtain a crystallized film.

When the properties of the film were measured, it had a tensile strength of 12 kg/mm², a tensile modulus of 250 kg/mm², and an elongation at rupture of 90%. The oxygen index of the film was then measured to be 35.5 which shows excellent inflammability.

Although the crystallized film swelled when immersed in concentrated sulfuric acid for a long time, it was so stable that it was not corroded with other strong acids such as hydrochloric acid, nitric acid, dichloroacetic acid, and trifluoroacetic acid, strong alkali such as sodium hydroxide and potassium hydroxide, organic solvents such as acetone, dimethyl ether, methyl ethyl ketone, benzene, toluene, ethyl acetate, dimethylformamide, N-methyl-2-pyrrolidone, and methylene chloride and hot water.

Comparative Example 18

The production of a film and the measurement of the properties thereof were carried out in the same manner as in Example 34 with the exception that a polyetheretherketone (Trademark: Victrex PEEK 450G, produced by I.C.I. Ltd.) was used in place of the polyether copolymer used in Example 34.

The obtained film had a tensile strength of 9 kg/mm², a tensile modulus of 210 kg/mm², an elongation at rupture of 170%, and an oxygen index of 23.5.

The film was dissolved not only in concentrated sulfuric acid but also in other chemical agents or solvents such as p-chlorophenol and dichloroacetic acid, and crazing was observed when the film was immersed in acetone.

Example 36

A transparent, amorphous film was produced by press forming the polyether copolymer prepared in Preparation Example 1 at 400° C., followed by introducing the formed film into ice water. The film had a thickness of 200 μm.

The film was stretched under the conditions shown in Table 8 by using a uniaxial stretching machine (produced by Shibata Kikai Co., Ltd.) and a biaxial stretching machine (produced by Toyo Seiki Co., Ltd.) (stretching speed: 1000 %/min.).

The properties of the obtained stretching films are shown in Table 8. The measurements of the properties were conducted according to ASTM D-882.

Examples 37 and 38

Stretched films were produced under the stretching conditions and the conditions of heating treatment shown in Table 8, by using the amorphous films produced in Preparation Examples 3 and 4.

The properties of the obtained films are shown in Table 8.

Examples 39 and 40

Stretched films were produced by using the amorphous film prepared in Preparation Example 1 by employing draw ratios and conditions of heating treatment which are shown in Table 8 and are different from those in Example 8.

The properties of the stretched films are shown in Table 8.

Comparative Example 19

A stretched film was produced by using a polyetheretherketone (Trademark: Victrex PEEK 450G produced by I.C.I. Ltd.) under the stretching conditions and the conditions of heating treatment shown in Table 8.

The properties of the obtained stretched films are shown in Table 8.

TABLE 8

| Film | Stretching temperature Draw ratios in length/in width | The conditions of heating treatment | Directions | Tensile strength (kg/mm²) | Tensile modulus (kg/mm²) | Elongation at rupture (%) |
|---|---|---|---|---|---|---|
| Example 36 | 200° C. | 230° C. | MD | 27 | 280 | 60 |
| | 2/0 | 1 min. | TD | 12 | 250 | 60 |
| | 200° C. | 230° C. | MD | 29 | 380 | 60 |
| | 2/2 | 1 min. | TD | 29 | 380 | 60 |
| Example 37 | 190° C. | 210° C. | MD | 28 | 390 | 50 |
| | 2/0 | 1 min. | TD | 13 | 260 | 90 |
| | 190° C. | 210° C. | MD | 28 | 400 | 50 |
| | 2/2 | 1 min. | TD | 28 | 400 | 50 |
| Example 38 | 210° C. | 260° C. | MD | 27 | 390 | 80 |
| | 2/0 | 1 min. | TD | 12 | 240 | 110 |
| | 210° C. | 260° C. | MD | 28 | 400 | 80 |
| | 2/2 | 1 min. | TD | 28 | 400 | 80 |
| Comparative Example 19 | 170° C. | 260° C. | MD | 13 | 300 | 80 |
| | 2/0 | 5 min. | TD | 9 | 210 | 150 |
| | 170° C. | 260° C. | MD | 12 | 310 | 80 |
| | 2/2 | 5 min. | TD | 12 | 310 | 85 |
| Example 39 | 210° C. | 230° C. | MD | 29 | 400 | 50 |
| | 3/0 | 1 min. | TD | 12 | 250 | 90 |
| | 210° C. | 230° C. | MD | 29 | 410 | 65 |
| | 2.5/2.5 | 1 min. | TD | 29 | 400 | 65 |
| Example 40 | 220° C. | 230° C. | MD | 33 | 430 | 30 |
| | 4/0 | 1 min. | TD | 11 | 260 | 80 |
| | 220° C. | 230° C. | MD | 36 | 440 | 30 |
| | 3/3 | 1 min. | TD | 36 | 440 | 30 |

The draw ratio in width of 0 menas that a film is stretched uniaxially.

What is claimed is:

1. A polyether copolymer, comprising: the repeating units represented by the following general formula (I)

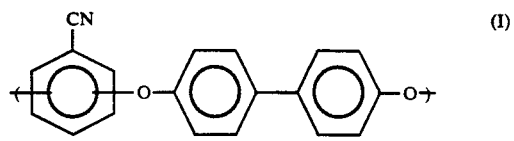

and the repeating units represented by the following formula (II)

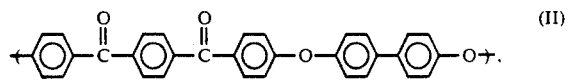

the molar ratio of the repeating units represented by the formula (I) based on the total of the repeating units represented by the formula (I) and the repeating units represented by the formula (II) being from 0.1 to 0.8, and the polyether copolymer having a melt viscosity (the viscosity under no shearing stress) of at least 500 poise as measured at 400° C.

2. The polyether copolymer of claim 1, wherein the repeating units represented by the general formula (I) are represented by the following formula

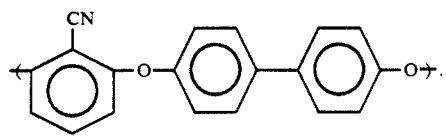

3. A resin composition, comprising:
(A) a polyether copolymer comprising the repeating units represented by the following general formula (I)

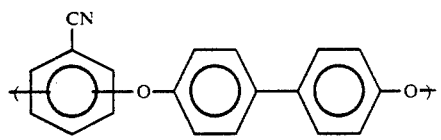

and the repeating units represented by the following formula (II)

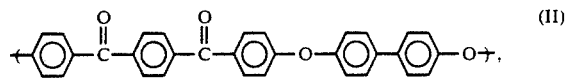

the molar ratio of the repeating units represented by the formula (I) based on the total of the repeating units represented by the formula (I) and the repeating units represented by the formula (II) being from 0.1 to 0.8, and the polyether copolymer having a melt viscosity (the viscosity under no shearing stress) of at least 500 poise as measured at 400° C; and
(B) a heat-resistance thermoplastic resin other than the polyether copolymer (A),
the polyether copolymer being present within the resin composition in an amount of from 10 to 90% by weight based on the total of the polyether copolymer and the heat-resistant thermoplastic resin.

4. The resin composition of claim 3, wherein the repeating units represented by the general formula (I) are represented by the following formula

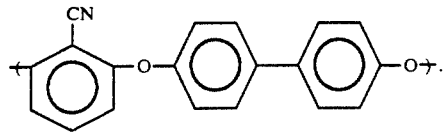

5. The resin composition of claim 3, wherein the heat-resistant thermoplastic resin is selected from the group consisting of polycarbonates, polyethersulfones, polyetherimides, polyetheretherketones, polycyanoarylethers, polyesters, and polyphenylenesulfides.

6. The resin composition of claim 5, wherein the repeating units represented by the general formula (I) are represented by the following formula

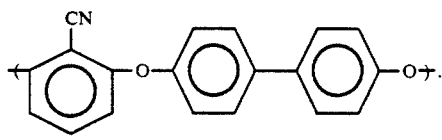

7. The resin composition of claim 6, wherein the heat-resistant thermoplastic resin is selected from the group consisting of polycarbonates, polyetheretherketones, polyethersulfones, polyetherimides, and polyesters.

8. A resin composition, comprising:
(A) a polyether copolymer comprising the repeating units represented by the following general formula (I)

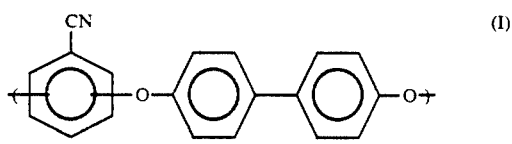

and the repeating units represented by the following formula (II)

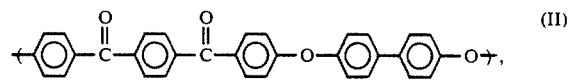

the molar ratio of the repeating units represented by the formula (I) based on the total of the repeating units represented by the formula (I) and the repeating units represented by the formula (II) being from 0.1 to 0.8, and the polyether copolymer having a melt viscosity (the viscosity under no shearing stress) of at least 500 poise as measured at 400° C.; and
(C) an inorganic filler,
the polyether copolymer being present within the resin composition in an amount of from 30 to 99% by weight based on the total of the polyether copolymer and the inorganic filler.

9. The resin composition of claim 8, wherein the repeating units represented by the general formula (I) are represented by the following formula

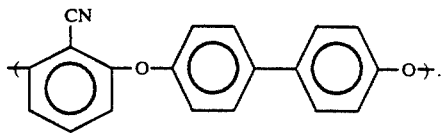

10. The resin composition of claim 8, wherein the inorganic filler is selected from the group consisting of fibrous inorganic materials, metal oxides, clay, minerals, metallic salts, metals, and ceramics.

11. The resin composition of claim 10, wherein the inorganic filler is a fibrous inorganic material selected from the group consisting of carbon fiber, glass fiber, alumina fiber, silicon nitride fiber, and carbon whisker, the fibrous inorganic material having a mean fiber diameter of from 1 to 20 μm and an aspect ratio of from 100 to 3,000.

12. The resin composition of claim 11, wherein the repeating units represented by the general formula (I) are represented by the following formula

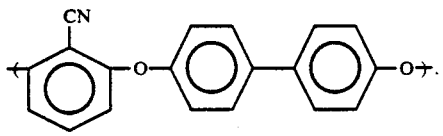

13. The resin composition of claim 12, wherein the inorganic filler is glass fiber or carbon fiber, the glass fiber or carbon fiber having a mean fiber diameter of from 1 to 20 μm and an aspect ratio of from 100 to 3,000.

14. A resin composition, comprising:
(A) a polyether copolymer comprising the repeating units represented by the following general formula (I)

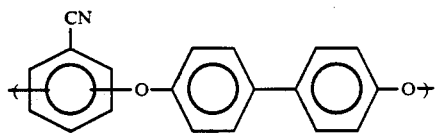

and the repeating units represented by the following formula (II)

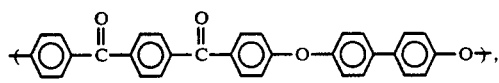

the molar ratio of the repeating units represented by the formula (I) based on the total of the repeating units represented by the formula (I) and the repeating units represented by the formula (II) being from 0.1 to 0.8, and the polyether copolymer having a melt viscosity (the viscosity under no shearing stress) of at least 500 poise as measured at 400° C.

(B) a heat-resistant thermoplastic resin other than the polyether copolymer (A); and
(C) an inorganic filler;

the polyether copolymer being present in the resin composition in an amount of from 10 to 90% by weight based on the total of the polyether copolymer and the heat-resistant thermoplastic resin, and the inorganic filler being present in the resin composition in an amount of from 1 to 50% by weight based on the total of the polyether copolymer, the heat-resistant thermoplastic resin, and the inorganic filler.

15. The resin composition of claim 14, wherein the repeating units represented by the general formula (I) are represented by the following formula

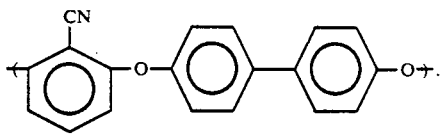

16. The resin composition of claim 14, wherein the heat-resistant thermoplastic resin is selected from the group consisting of polycarbonates, polyethersulfones, polyetherimides, polyetheretherketones, polycyanoarylethers, polyesters, and polyphenylenesulfides, and the inorganic filler is selected from the group consisting of fibrous inorganic materials, metal oxides, clay, minerals, metallic salts, metals, and ceramics.

17. The resin composition of claim 16, wherein the inorganic filler is a fibrous inorganic material or a metal oxide, the fibrous inorganic material being selected from the group consisting of carbon fiber, glass fiber, alumina fiber, silicon nitride fiber, and carbon whisker, and the fibrous inorganic material having a mean fiber diameter of from 1 to 20 μm and an aspect ratio of from 100 to 3,000.

18. The resin composition of claim 17, wherein the repeating units represented by the general formula (I) are represented by the following formula

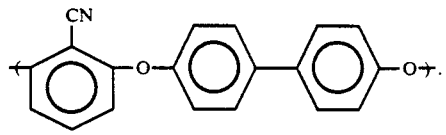

19. The resin composition of claim 18, wherein the heat-resistant thermoplastic resin is selected from the group consisting of a polyphenylenesulfide, a polyethyleneterephthalate, and a polyetheretherketone, and the inorganic filler is selected from the group consisting of glass fiber, carbon fiber and titanium oxide, the glass fiber and the carbon fiber having a mean fiber diameter of from 1 to 20 μm and an aspect ratio of from 100 to 3,000.

20. A heat-resistant laminate, comprising:
(A) a layer of a polyether copolymer comprising the repeating units represented by the following general formula (I)

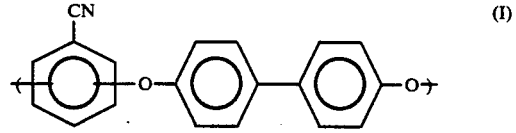

and the repeating units represented by the following formula (II)

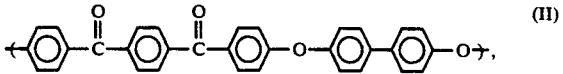

the molar ratio of the repeating units represented by the formula (I) based on the total of the repeating units represented by the formula (I) and the repeating units represented by the formula (II) being from 0.1 to 0.8, and the polyether copolymer having a melt viscosity (the viscosity under no shearing stress) of at least 500 poise as measured at 400° C.; and (B) a layer of a fibrous reinforcing material.

21. The heat-resistant laminate of claim 20, wherein the ratio of the weight of the layer of the polyether copolymer is from 20 to 85% by weight based on the total of the weights of the layer of the polyether copolymer and the layer of the fibrous reinforcing material.

22. The heat-resistant laminate of claim 21, wherein the repeating units represented by the following general formula (I) are represented by the following formula

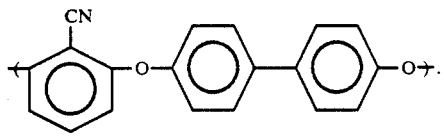

23. The heat-resistant laminate of claim 21, wherein the fibrous reinforcing material is selected from the group consisting of glass fiber, carbon fiber, and aromatic polyamide fiber.

24. The heat-resistant laminate of claim 23, wherein the repeating units represented by the general formula (I) are represented by the following formula

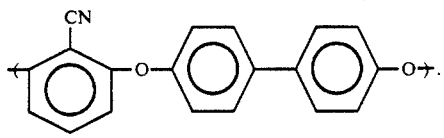

25. The heat-resistant laminate of claim 24 comprising two layers of the polyether copolymer and one layer of the fibrous reinforcing material disposed between the layers of the polyether copolymer, the fibrous reinforcing material being selected from the group consisting of carbon fiber, glass fiber, and aromatic polyamide fiber.

26. A polyether copolymer fiber produced by melt spinning a polyether copolymer at a temperature higher than the melting point of the polyether copolymer by from 10 to 70° C., the polyether copolymer comprising the repeating units represented by the following general formula (I)

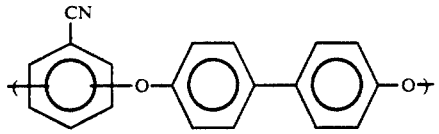

and the repeating units represented by the following formula (II)

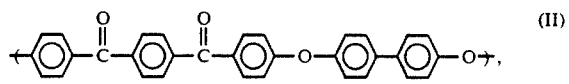

the molar ratio of the repeating units represented by the formula (I) based on the total of the repeating units represented by the formula (I) and the repeating units represented by the formula (II) being from 0.1 to 0.8, and the polyether copolymer having a melt viscosity (the viscosity under no shearing stress) of at least 500 poise as measured at 400° C.

27. The polyether copolymer fiber of claim 26, wherein the repeating units represented by the general formula (I) are represented by the following formula

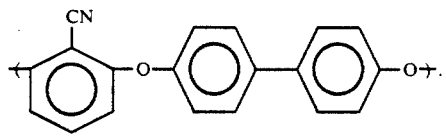

28. A polyether copolymer fiber produced by (A) melt spinning a polyether copolymer at a temperature higher than the melting point of the polyether copolymer by from 10 to 70° C. to obtain a fiber, the polyether copolymer comprising the repeating units represented by the following general formula (I)

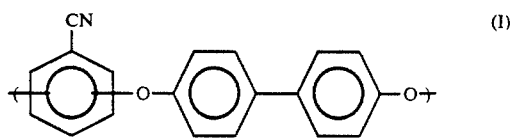

and the repeating units represented by the following formula (II)

$$\text{(II)}$$

the molar ratio of the repeating units represented by the formula (I) based on the total of the repeating units represented by the formula (I) and the repeating units represented by the formula (II) being from 0.1 to 0.8, and the polyether copolymer having a melt viscosity (the viscosity under no shearing stress) of at least 500 poise as measured at 400° C.; and (B) stretching the fiber by a draw ratio of at least 1.5 at a temperature higher than the glass transition temperature of the polyether copolymer by from 10 to 60° C.

29. The polyether copolymer fiber of claim 28 produced by stretching the fiber obtained by the melt spinning by a draw ratio of from 2 to 10 at a temperature higher than the glass transition temperature of the polyether copolymer by from 10 to 60° C.

30. The polyether copolymer fiber of claim 29, wherein the repeating units represented by the general formula (I) are represented by the following formula

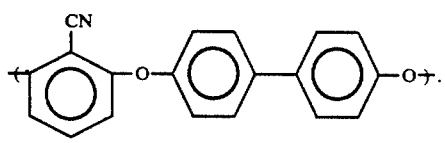

31. A polyether copolymer fiber produced by (A) melt spinning a polyether copolymer at a temperature higher than the melting point of the polyether copolymer by from 10 to 70° C. to obtain a fiber, the polyether copolymer comprising the repeating units represented by the following general formula (I)

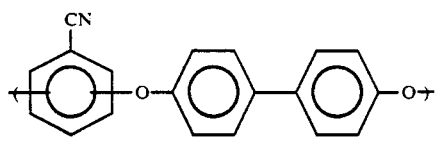

and the repeating units represented by the following formula (II)

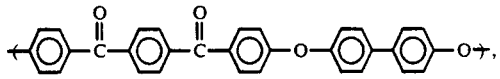

the molar ratio of the repeating units represented by the formula (I) based on the total of the repeating units represented by the formula (I) and the repeating units represented by the formula (II) being from 0.1 to 0.8, and the polyether copolymer having a melt viscosity (the viscosity under no shearing stress) of at least 500 poise as measured at 400° C;

(B) stretching the fiber by a draw ratio of at least 1.5 at a temperature higher than the glass transition temperature of the polyether copolymer by from 10 to 60° C., and (C) subjecting the stretched fiber to heating treatment at a temperature higher than the crystallizing temperature of the polyether copolymer and lower than the melting point of the polyether copolymer.

32. The polyether copolymer fiber of claim 31 produced by stretching the fiber obtained by the melt spinning by a draw ratio of from 2 to 10 at a temperature higher than the glass transition temperature of the polyether copolymer by from 10 to 60° C., followed by subjecting the stretched fiber to the heating treatment at a temperature higher than the crystallizing temperature of the polyether copolymer and lower than the melting point of the polyether copolymer.

33. The polyether copolymer fiber of claim 32, wherein the repeating units represented by the general formula (I) are represented by the following formula

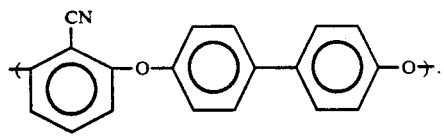

34. A polyether copolymer film produced by forming a polyether copolymer at a temperature higher than the melting point of the polyether copolymer by from 10 to 100° C. to obtain a film, the polyether copolymer comprising the repeating units represented by the following general formula (I)

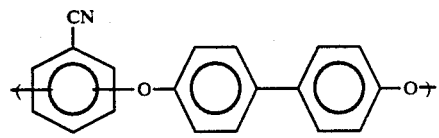

and the repeating units represented by the following formula (II)

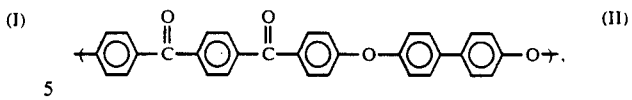

the molar ratio of the repeating units represented by the formula (I) based on the total of the repeating units represented by the formula (I) and the repeating units represented by the formula (II) being from 0.1 to 0.8, and the polyether copolymer having a melt viscosity (the viscosity under no shearing stress) of at least 500 poise as measured at 400° C.

35. The polyether copolymer film of claim 34, wherein the repeating units represented by the general formula (I) are represented by the following formula

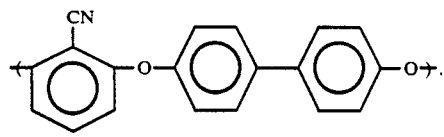

36. A polyether copolymer film produced by (A) forming a polyether copolymer at a temperature higher than the melting point of the polyether copolymer by from 10 to 100° C. to obtain a film, the polyether copolymer comprising the repeating units represented by the following general formula (I)

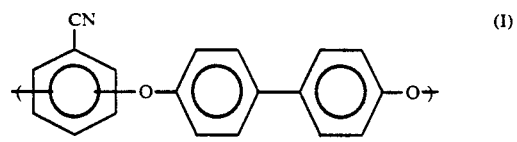

and the repeating units represented by the following formula (II)

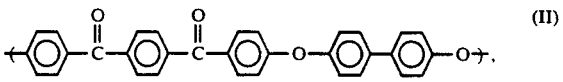

the molar ratio of the repeating units represented by the formula (I) based on the total of the repeating units represented by the formula (I) and the repeating units represented by the formula (II) being from 0.1 to 0.8, and the polyether copolymer having a melt viscosity (the viscosity under no shearing stress) of at least 500 poise as measured at 400° C.; and (B) subjecting the film to heating treatment at a temperature higher than the glass transition temperature of the polyether copolymer and lower than the melting point of the polyether copolymer.

37. The polyether copolymer film of claim 26, wherein the repeating units represented by the general formula (I) are represented by the following formula

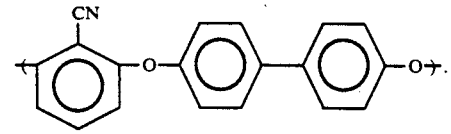

38. A polyether copolymer film produced by (A) forming a polyether copolymer at a temperature higher than the melting point of the polyether copolymer by from 10 to 100° C. to obtain a film, the polyether copolymer comprising the repeating units represented by the following general formula (I)

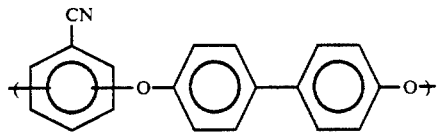

and the repeating units represented by the following formula (II)

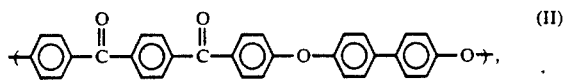

the molar ratio of the repeating units represented by the formula (I) based on the total of the repeating units represented by the formula (I) and the repeating units represented by the formula (II) being from 0.1 to 0.8, and the polyether copolymer having a melt viscosity (the viscosity under no shearing stress) of at least 500 poise as measured at 400° C.; and (B) stretching the film at a temperature not higher than the melting point of the polyether copolymer.

39. The polyether copolymer film of claim 38 produced by uniaxially stretching the film obtained by the forming by from 1.5 to 10 times at a temperature not higher than the melting point of the polyether copolymer.

40. The polyether copolymer film of claim 39, wherein the repeating units represented by the general formula (I) are represented by the following formula

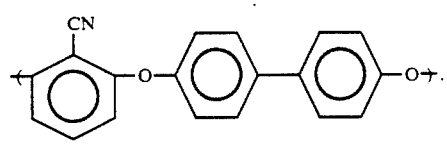

41. The polyether copolymer film of claim 38 produced by biaxially stretching the film obtained by the forming by from 1.5 to 10 times in both directions, respectively, at a temperature not higher than the melting point of the polyether copolymer.

42. The polyether copolymer film of claim 41, wherein the repeating units represented by the general formula (I) are represented by the following formula

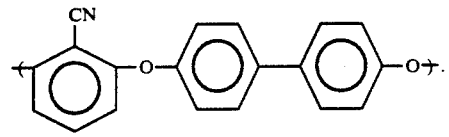

43. A polyether copolymer film produced by (A) forming a polyether copolymer at a temperature higher than the melting point of the polyether copolymer by from 10 to 100° C. to obtain a film, the polyether copolymer comprising the repeating units represented by the following general formula (I)

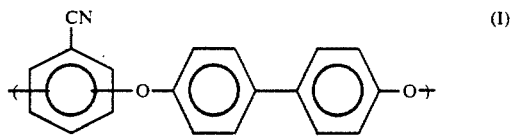

and the repeating units represented by the following formula (II)

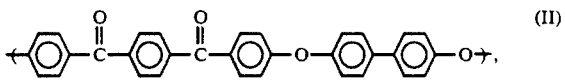

the molar ratio of the repeating units represented by the formula (I) based on the total of the repeating units represented by the formula (I) and the repeating units represented by the formula (II) being from 0.1 to 0.8, and the polyether copolymer having a melt viscosity (the viscosity under no shearing stress) of at least 500 poise as measured at 400° C.;

(B) stretching the film at a temperature not higher than the melting point of the polyether copolymer, and (C) subjecting the stretched film to heating treatment at a temperature higher than the glass transition temperature of the polyether copolymer and lower than the melting point of the polyether copolymer.

44. The polyether copolymer film of claim 43 produced by uniaxially stretching the film obtained by the forming by from 1.5 to 10 times at a temperature not higher than the melting point of the polyether copolymer, followed by subjecting the stretched film to the heating treatment at a temperature higher than the glass transition temperature of the polyether copolymer and lower than the melting point of the polyether copolymer.

45. The polyether copolymer film of claim 44, wherein the repeating units represented by the general formula (I) are represented by the following formula

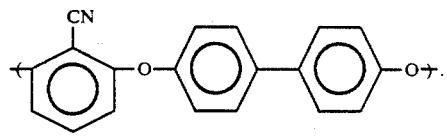

46. The polyether copolymer film of claim 43 produced by biaxially stretching the film obtained by the forming by from 1.5 to 10 times in both directions, respectively, at a temperature not higher than the melting point of the polyether copolymer, followed by subjecting the stretched film to the heating treatment at a temperature higher than the glass transition temperature of the polyether copolymer and lower than the melting point of the polyether copolymer.

47. The polyether copolymer film of claim 46, wherein the repeating units represented by the general formula (I) are represented by the following formula

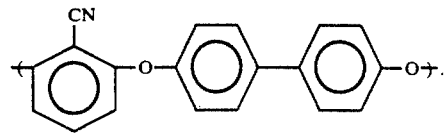

* * * * *